US012677306B2

(12) United States Patent
Fan et al.

(10) Patent No.: US 12,677,306 B2
(45) Date of Patent: Jul. 7, 2026

(54) INTERFERENCE MEASUREMENT REPORTING METHOD AND COMMUNICATIONS APPARATUS

(71) Applicant: HUAWEI TECHNOLOGIES CO., LTD., Shenzhen (CN)

(72) Inventors: Bo Fan, Chengdu (CN); Xi Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 847 days.

(21) Appl. No.: 17/707,148

(22) Filed: Mar. 29, 2022

(65) Prior Publication Data

US 2022/0225337 A1     Jul. 14, 2022

Related U.S. Application Data

(63) Continuation of application No. PCT/CN2019/109689, filed on Sep. 30, 2019.

(51) Int. Cl.
*H04W 72/541*     (2023.01)
*H04W 24/10*     (2009.01)
(Continued)

(52) U.S. Cl.
CPC ......... *H04W 72/541* (2023.01); *H04W 24/10* (2013.01); *H04W 72/046* (2013.01); *H04W 72/1263* (2013.01)

(58) Field of Classification Search
CPC ............. H04W 24/10; H04W 72/1263; H04W 72/541; H04W 72/046; H04B 17/345; H04B 17/24
See application file for complete search history.

(56) References Cited

U.S. PATENT DOCUMENTS

2007/0008943 A1*     1/2007     Grant .................... H04L 1/0033
                                                    370/342
2019/0297603 A1     9/2019     Guo et al.
(Continued)

FOREIGN PATENT DOCUMENTS

| CN | 107666340 A | 2/2018 |
| CN | 109391992 A | 2/2019 |

(Continued)

OTHER PUBLICATIONS

Huawei et al, "Discussion on CSI Framework Design", 3GPP TSG RAN WG1 NR Ad Hoc Meeting R1-1709931, Jun. 30, 2017, total 7 pages.

(Continued)

*Primary Examiner* — Huy D Vu
*Assistant Examiner* — Bao G Nguyen
(74) *Attorney, Agent, or Firm* — HAUPTMAN HAM, LLP

(57) ABSTRACT

A method includes configuring, by a terminal, spatial reception parameters of K channel resources as spatial reception parameters of each interference resource of M interference resources of the terminal, wherein the K channel resources are channel resources on which the terminal is configured to simultaneously receive signals from a network device, and M is a positive integer. The method further includes determining, by the terminal, a first measurement result of the K channel resources based on spatial reception parameters of a first interference resource in the M interference resources, wherein K is a positive integer greater than or equal to 2. The method further includes sending, by the terminal, a measurement report to the network device, wherein the measurement report indicates M measurement results, and the measurement report includes the first measurement result.

17 Claims, 9 Drawing Sheets

(51) Int. Cl.
 *H04W 72/044* (2023.01)
 *H04W 72/1263* (2023.01)

(56) References Cited

U.S. PATENT DOCUMENTS

| | | | | |
|---|---|---|---|---|
| 2019/0335367 A1* | 10/2019 | Yue | .................. | H04W 36/0016 |
| 2021/0410187 A1* | 12/2021 | Yang | ................ | H04W 74/0808 |
| 2022/0174712 A1* | 6/2022 | Zhang | .................. | H04L 5/0048 |
| 2022/0264348 A1* | 8/2022 | Manolakos | .......... | H04B 17/345 |

FOREIGN PATENT DOCUMENTS

| | | |
|---|---|---|
| CN | 109586819 A | 4/2019 |
| WO | 2019099857 A1 | 5/2019 |

OTHER PUBLICATIONS

Huawei et al, "Discussion on CSI Framework Design", 3GPP TSG RAN WG1 Meeting #89 R1-1706926, May 19, 2017, total 9 pages.
3GPP TS 38.331 V15.3.0 (Sep. 2018); 3rd Generation Partnership Project; Technical Specification Group Radio Access Network; NR; Radio Resource Control (RRC) protocol specification(Release 15); total 445 pages.
3GPP TS 38.211 V15.0.0, 3rd Generation Partnership Project; Technical Specification Group Radio Access Network; NR; Physical channels and modulation(Release 15), Dec. 2017. total 73 pages.
3GPP TS 38.212 V15.0.0 (Jul. 2017), 3rd Generation Partnership Project; Technical Specification Group Radio Access Network; NR; Multiplexing and channel coding(Release 15), total 82 pages.
3GPP TS 38.213 V15.0.0:"3rd Generation Partnership Project; Technical Specification Group Radio Access Network; NR; Physical layer procedures for control (Release 15)", 2017—12, total 56 pages.
3GPP TS 38.214 V15.0.0 (Dec. 2017), 3rd Generation Partnership Project; Technical Specification Group Radio Access Network; NR; Physical layer procedures for data (Release 15), total 71 pages.
International Search Report issued in corresponding International Application No. PCT/CN2019/109689, dated Jul. 3, 2020, pp. 1-9.
Huawei et al: "Enhancements on multi-beamll-12 operation",3GPP Draft; R1-1908067,Aug. 17, 2019, XP051764690.
Lenovo et al: "Discussion of multi-beam operation",3GPP Draft; R1-1812785,Nov. 2, 2018, XP051479028.
Extended European Search Report issued in corresponding European Application No. 19948025.2, dated Sep. 8, 2022, pp. 1-7.

* cited by examiner

Interference signal

INTERFERENCE MEASUREMENT REPORTING METHOD AND COMMUNICATIONS APPARATUS

CROSS-REFERENCE TO RELATED APPLICATIONS

This application is a continuation of International Application No. PCT/CN2019/109689, filed on Sep. 30, 2019, which is incorporated herein by reference in its entirety.

TECHNICAL FIELD

This application relates to the high-frequency communications field, and in particular, to an interference measurement reporting method and a communications apparatus.

BACKGROUND

A 5th generation (5G) mobile communications system uses high-frequency communication, that is, uses an ultra-high frequency band (>6 GHz) signal to transmit data. A problem of the high-frequency communication is that energy of a signal sharply decreases as a transmission distance increases, resulting in a short transmission distance of the signal. To overcome this problem, an analog beam technology is used in the high-frequency communication, and a large-scale antenna array is used for weighted processing, so that signal energy is concentrated in a relatively small range, to form a signal similar to an optical beam (the signal is referred to as an analog beam, a beam for short), so as to extend a transmission distance.

A network device may generate different beams that point to different transmission directions. A specific beam to be used for transmission is determined in a beam measurement process. Specifically, the network device configures, for a terminal by using measurement configuration information, a plurality of channel measurement resources for measuring channel resources, where each channel measurement resource corresponds to one beam. The terminal measures the channel measurement resources configured by the network device to measure a reference signal received power (RSRP) of each channel resource (beam), and then reports an index of at least one channel resource with a relatively large RSRP and the corresponding RSRP to the network device. However, when the network device sends data to the terminal by using a plurality of beams, interference may exist between the beams. In this case, a data transmission error is caused, and data transmission quality is reduced.

In solution of other approaches, the terminal may measure impact of another beam on a beam. That is, the terminal may measure impact of an interference resource on a channel resource. Specifically, the terminal may calculate a signal to interference plus noise ratio (SINR) for the channel resource, and report the SINR to the network device. In this way, the network device may learn the impact of the interference resource on the channel resource.

When a plurality of transmission beams are simultaneously used for transmission, the terminal device may use a plurality of reception beams for receiving. In this scenario, if another interference signal exists, the terminal device may receive the interference signal from the plurality of reception beams. Therefore, in a beam measurement process, to accurately measure interference caused by the interference signal to the plurality of transmission beams, all the plurality of reception beams are to be used to measure the interference signal. However, in other approaches, the network device can indicate only one reception beam to the terminal device. In this case, the foregoing measurement requirement cannot be met.

SUMMARY

This application provides an interference measurement reporting method and a communications apparatus, so that interference from an interference resource to each of K channel resources on which signals are simultaneously sent can be measured, to improve accuracy of interference measurement.

According to a first aspect, an interference measurement reporting method is provided, where the method includes: A terminal uses spatial reception parameters of K channel resources as spatial reception parameters of each interference resource of M interference resources of the terminal, where the K channel resources are channel resources on which the terminal can receive signals simultaneously sent by a network device by using the K channel resources, and M is a positive integer. The terminal determines a first measurement result of the K channel resources based on the spatial reception parameters of a first interference resource in the M interference resources, where K is a positive integer greater than or equal to 2. The terminal sends a measurement report to the network device, where the measurement report is used to indicate M measurement results, and includes the first measurement result.

The network device simultaneously sends the signals by using the K channel resources, and the terminal may receive the signals that are sent by using the K channel resources. The terminal uses the spatial reception parameters of the K channel resources as the spatial reception parameters of each interference resource of the M interference resources, then measures the first interference resource based on the spatial reception parameters of the first interference resource in the M interference resources, determines the first measurement result of the K channel resources under interference of the first interference resource, and reports the M measurement results of the M interference resources to the network device by using the measurement report, so that the network device can more accurately learn accuracy of interference from an interference resource to a channel resource.

In some embodiments, before a terminal uses spatial reception parameters of K channel resources as spatial reception parameters of each interference resource of M interference resources of the terminal, the method further includes: The terminal receives measurement configuration information, where the measurement configuration information is used to configure N channel resources and the M interference resources, and N is a positive integer. The terminal determines, from the N channel resources, the K channel resources on which the terminal can receive the signals simultaneously sent by the network device.

In a measurement reporting process, the network device configures the N channel resources and the M interference resources by using the measurement configuration information. The terminal first selects, from the N channel resources, the K channel resources that can be simultaneously received by the terminal, and then uses the spatial reception parameters of the K channel resources as the spatial reception parameters of each interference resource of the M interference resources, to measure the M interference resources. In this way, the network device does not configure the N channel resources and the M interference resources for a plurality of times, and this reduces signaling overheads.

In some embodiments, time corresponding to the N channel resources is earlier than time corresponding to the M interference resources.

The terminal may determine, in advance, the K channel resources on which the terminal can receive signals that are simultaneously sent, then uses the spatial reception parameters of the K channel resources as the spatial reception parameters of each interference resource of the M interference resources, further measures the first interference resource based on the spatial reception parameters of the first interference resource in the M interference resources, determines the first measurement result of the K channel resources under the interference of the first interference resource, and reports the M measurement results of the M interference resources to the network device by using the measurement report, so that the network device can more accurately learn the accuracy of the interference from the interference resource to the channel resource.

In some embodiments, that the terminal uses the spatial reception parameters of the K channel resources as the spatial reception parameters of an interference resource includes: The terminal uses the spatial reception parameters of the K channel resources as the spatial reception parameters of each interference resource of the M interference resources when at least one of the following cases is met: A group-based beam reporting parameter in the measurement configuration information indicates enabled, where the group-based beam reporting parameter is used to indicate whether to report the M measurement results. A report quantity parameter in the measurement configuration information indicates that the measurement result includes a signal to interference plus noise ratio (SINR). The M interference resources are configured in the measurement configuration information. No transmission configuration index state (TCI-state) of the M interference resources is configured in the measurement configuration information.

The terminal may set a condition, and only when the condition is met, the spatial reception parameters of the K channel resources are used as the spatial reception parameters of each interference resource of the M interference resources. In other words, the terminal may flexibly select an appropriate interference measurement determining manner.

In some embodiments, before a terminal uses spatial reception parameters of K channel resources as spatial reception parameters of an interference resource of the terminal, the method further includes: The terminal receives first measurement configuration information from the network device, where the first measurement configuration information is used to configure the M interference resources and the spatial reception parameters of the K channel resources.

The K channel resources are directly configured, rather than determined from the configured N channel resources. That is, the network device configures the K channel resources and the M interference resources. The terminal measures the M interference resources by using the spatial reception parameters of the K channel resources as the spatial reception parameters of each interference resource of the M interference resources. In this way, the terminal does not perform selection, and power consumption of the terminal is reduced.

In some embodiments, that a terminal uses spatial reception parameters of K channel resources as spatial reception parameters of an interference resource of the terminal includes: The terminal uses the spatial reception parameters of the K channel resources as the spatial reception parameters of each interference resource of the M interference resources when at least one of the following cases is met: A group-based beam reporting parameter in the first measurement configuration information indicates enabled, and a report quantity parameter in the first measurement configuration information indicates that the measurement result includes an SINR, where the group-based beam reporting parameter is used to indicate whether to report the M measurement results. The group-based beam reporting parameter in the first measurement configuration information indicates enabled, and the M interference resources are configured in the first measurement configuration information, where the group-based beam reporting parameter is used to indicate whether to report the M measurement results. The group-based beam reporting parameter in the first measurement configuration information indicates enabled, the M interference resources are configured in the first measurement configuration information, and no transmission configuration index state (TCI-state) of the M interference resources is configured in the first measurement configuration information, where the group-based beam reporting parameter is used to indicate whether to report the M measurement results.

The terminal may set a condition, and only when the condition is met, the spatial reception parameters of the K channel resources are used as the spatial reception parameters of each interference resource of the M interference resources. In other words, the terminal may flexibly select an appropriate interference measurement determining manner.

In some embodiments, before the terminal receives first measurement configuration information from the network device, the method further includes: The terminal receives second measurement configuration information from the network device, where the second measurement configuration information is used to configure the N channel resources, and N is a positive integer. The terminal determines, based on the second measurement configuration information, the K channel resources on which the terminal can receive the signals simultaneously sent by the network device. The terminal sends indication information to the network device, where the indication information is used to indicate the K channel resources.

The terminal may select a channel resource in advance, and notify the network device of the selected channel resource, to improve accuracy of the first measurement configuration information configured by the network device.

In some embodiments, that the terminal determines, based on the second measurement configuration information, the K channel resources on which the terminal can receive the signals simultaneously sent by the network device includes: When at least one of the following cases is met, the terminal determines, based on the second measurement configuration information, the K channel resources on which the terminal can receive the signals simultaneously sent by the network device: A group-based beam reporting parameter in the second measurement configuration information indicates enabled, and a report quantity parameter in the second measurement configuration information indicates that the measurement result includes a reference signal received power (RSRP), where the group-based beam reporting parameter is used to indicate whether to report the M measurement results. The group-based beam reporting parameter in the second measurement configuration information indicates enabled, and the M interference resources are not configured in the second measurement configuration information, where the group-based beam reporting parameter is used to indicate whether to report the M measurement results.

The terminal may set a condition. When the condition is met, the terminal selects, from the N channel resources, the K channel resources on which the terminal can receive the signals simultaneously sent by the network device. In other words, the terminal may set the condition to flexibly set whether the K channel resources on which the terminal can receive the signals simultaneously sent by the network device are to be determined.

In some embodiments, the measurement result includes the SINR, and further includes at least one SINR difference. The at least one SINR difference is a difference between an SINR in each measurement result of the K measurement results except the first measurement result and an SINR in the first measurement result. The first SINR included in the first measurement result is a largest SINR in the K measurement result, there is a mapping relationship between the first SINR and a step, and a product of the step and a bit value is used to indicate the SINR difference.

Different reference SINRs may correspond to different steps, which avoids using a fixed step, and improves flexibility of indicating the SINR difference.

According to a second aspect, an interference measurement reporting method is provided. The method includes: determining measurement configuration information, where the measurement configuration information is used to configure N channel resources and M interference resources, and N is a positive integer; and sending the measurement configuration information to a terminal.

In a measurement reporting process, a network device configures the N channel resources and the M interference resources by using the measurement configuration information. The terminal first selects, from the N channel resources, the K channel resources that can be simultaneously received by the terminal, and then uses spatial reception parameters of the K channel resources as spatial reception parameters of each interference resource of the M interference resources, to measure the M interference resources. In this way, the network device does not configure the N channel resources and the M interference resources for a plurality of times, and this reduces signaling overheads.

In some embodiments, the measurement configuration information includes a group-based beam reporting parameter and/or a report quantity parameter. The group-based beam reporting parameter is used to indicate whether to report M measurement results, and the report quantity parameter is used to indicate that the measurement result includes a signal to interference plus noise ratio (SINR).

In some embodiments, the measurement result includes the SINR, and further includes at least one SINR difference. The at least one SINR difference is a difference between an SINR in each measurement result of the K measurement results except the first measurement result and an SINR in the first measurement result. The first SINR included in the first measurement result is a largest SINR in the K measurement result, there is a mapping relationship between the first SINR and a step, and a product of the step and a bit value is used to indicate the SINR difference.

Different reference SINRs may correspond to different steps, which avoids using a fixed step, and improves flexibility of indicating the SINR difference.

According to a third aspect, an interference measurement reporting method is provided. The method includes: determining first measurement configuration information, where the first measurement configuration information is used to configure M interference resources and spatial reception parameters of K channel resources; and sending the first measurement configuration information to a terminal.

The K channel resources are directly configured by a network device, rather than determined from configured N channel resources by the terminal. That is, the network device configures the K channel resources and the M interference resources. The terminal uses the spatial reception parameters of the K channel resources as spatial reception parameters of each interference resource of the M interference resources, to measure the M interference resources. In this way, the terminal does not perform selection, and power consumption of the terminal is reduced.

In some embodiments, the first measurement configuration information includes a group-based beam reporting parameter and/or a report quantity parameter. The group-based beam reporting parameter is used to indicate whether to report M measurement results, and the report quantity parameter is used to indicate that the measurement result includes a signal to interference plus noise ratio (SINR).

In some embodiments, before the first measurement configuration information is sent, second measurement configuration information is sent to the terminal, where the second measurement configuration information is used to configure the N channel resources, and N is a positive integer. Indication information is received from the terminal, where the indication information is used to indicate the K channel resources.

The network device first configures the N channel resources for the terminal, and the terminal may select a channel resource in advance, and notify the network device of the selected channel resource, to improve accuracy of the first measurement configuration information configured by the network device.

In some embodiments, the measurement result includes the SINR, and further includes at least one SINR difference. The at least one SINR difference is a difference between an SINR in each measurement result of the K measurement results except the first measurement result and an SINR in the first measurement result. The first SINR included in the first measurement result is a largest SINR in the K measurement result, there is a mapping relationship between the first SINR and a step, and a product of the step and a bit value is used to indicate the SINR difference.

Different reference SINRs may correspond to different steps, which avoids using a fixed step, and improves flexibility of indicating the SINR difference.

According to a fourth aspect, a method for determining a transmission beam of a channel resource is provided. The method includes: receiving measurement configuration information from a network device, where the measurement configuration information is used to configure N channel resources and M interference resources, and includes a repetition parameter of the N channel resources, and a status of the repetition parameter of the N channel resources indicates whether transmission beams of the N channel resources are the same; and determining, based on the repetition parameter of the N channel resources, whether the transmission beams of the N channel resources are the same.

The terminal determines, based on the repetition parameter in the measurement configuration information, whether the transmission beams of the N channel resources are the same. In other words, the network device may implicitly notify the terminal whether the transmission beams of the N channel resources are the same, to avoid direct indication, and reduce signaling overheads.

In some embodiments, the configuration information further includes a repetition parameter of the M interference resources, and a status of the repetition parameter of the M interference resources indicates whether transmission beams of the M interference resources are the same. Whether the transmission beams of the M interference resources are the same is determined based on the repetition parameter of the M interference resources.

The network device may implicitly notify the terminal whether the transmission beams of the M interference resources are the same, to avoid direct indication, and reduce signaling overheads.

In some embodiments, when a first status of the repetition parameter of the N channel resources indicates that the transmission beams of the N channel resources are the same and the transmission beams of the M interference resources are different, a measurement report includes at least one measurement result and an index of a channel resource corresponding to the at least one measurement result.

By reporting the index of the channel resource, the terminal may obtain information about the interference resource, that is, an interference resource corresponding to each reported measurement result, to improve data transmission performance.

According to a fifth aspect, a method for determining a transmission beam of a channel resource is provided. The method includes: determining measurement configuration information, where the measurement configuration information is used to configure N channel resources and M interference resources, and includes a repetition parameter of the N channel resources, and a status of the repetition parameter of the N channel resources indicates whether transmission beams of the N channel resources are the same; and sending the measurement configuration information to a terminal.

The terminal determines, based on the repetition parameter in the measurement configuration information, whether the transmission beams of the N channel resources are the same. In other words, the network device may implicitly notify the terminal whether the transmission beams of the N channel resources are the same, to avoid direct indication, and reduce signaling overheads.

In some embodiments, the configuration information further includes a repetition parameter of the M interference resources, and a status of the repetition parameter of the M interference resources indicates whether transmission beams of the M interference resources are the same. Whether the transmission beams of the M interference resources are the same is determined based on the repetition parameter of the M interference resources.

The network device may implicitly notify the terminal whether the transmission beams of the M interference resources are the same, to avoid direct indication, and reduce signaling overheads.

In some embodiments, when a first status of the repetition parameter of the N channel resources indicates that the transmission beams of the N channel resources are the same and the transmission beams of the M interference resources are different, a measurement report includes at least one measurement result and an index of a channel resource corresponding to the at least one measurement result.

By reporting the index of the channel resource, the terminal may obtain information about the interference resource, that is, an interference resource corresponding to each reported measurement result, to improve data transmission performance.

According to a sixth aspect, a signal transmission apparatus is provided. The apparatus may be a terminal, or a chip used for the terminal, for example, a chip that can be disposed in the terminal. The apparatus has a function of implementing the first aspect and various embodiments of the first aspect. The function may be implemented by hardware, or may be implemented by hardware executing corresponding software. The hardware or the software includes one or more modules corresponding to the function.

In a possible design, the apparatus includes a processing module and a transceiver module. The transceiver module may be, for example, at least one of a transceiver, a receiver, and a transmitter. The transceiver module may include a receiving module and a sending module, and may specifically include a radio frequency circuit or an antenna. The processing module may be a processor. In some embodiments, the apparatus further includes a storage module, and the storage module may be, for example, a memory. When the apparatus includes the storage module, the storage module is configured to store instructions. The processing module is connected to the storage module, and may execute the instructions stored in the storage module or instructions from others, so that the apparatus performs the method according to the first aspect and the various embodiments. In this design, the apparatus may be a terminal.

In another possible design, when the apparatus is a chip, the chip includes a processing module and a transceiver module. The transceiver module may be, for example, an input/output interface, a pin, or a circuit in the chip. The processing module may be, for example, a processor. The processing module may execute instructions, so that the chip in the terminal performs the foregoing method and any possible implementation method. In some embodiments, the processing module may execute instructions in a storage module, and the storage module may be a storage module in the chip, for example, a register or a buffer. The storage module may alternatively be located inside a communications device but outside the chip, for example, a read-only memory (ROM), another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the method according to the first aspect and any possible implementation.

According to a seventh aspect, a signal transmission apparatus is provided. The apparatus may be a network device, or a chip used in the network device, for example, a chip that can be disposed in the network device. The apparatus has a function of implementing the second aspect and various embodiments. The function may be implemented by hardware, or may be implemented by hardware executing corresponding software. The hardware or the software includes one or more modules corresponding to the function.

In a possible design, the apparatus includes a transceiver module and a processing module. The transceiver module may be, for example, at least one of a transceiver, a receiver, and a transmitter. The transceiver module may include a receiving module and a sending module, and may specifically include a radio frequency circuit or an antenna. The processing module may be a processor.

In some embodiments, the apparatus further includes a storage module, and the storage module may be, for example, a memory. When the apparatus includes the storage module, the storage module is configured to store instructions. The processing module is connected to the storage module, and may execute the instructions stored in the storage module or instructions from another module, so that the apparatus performs the method according to any one of the second aspect or the embodiments thereof.

In another possible design, when the apparatus is a chip, the chip includes a transceiver module and a processing module. The transceiver module may be, for example, an input/output interface, a pin, or a circuit in the chip. The processing module may be, for example, a processor. The processing module may execute instructions, so that the chip in the network device performs the method according to any one of the second aspect and the embodiments of the second aspect.

In some embodiments, the processing module may execute instructions in a storage module, and the storage module may be a storage module in the chip, for example, a register or a buffer. The storage module may alternatively be located inside a communications device but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the method according to the second aspect.

According to an eighth aspect, a signal transmission apparatus is provided. The apparatus may be a network device, or a chip used in the network device, for example, a chip that can be disposed in the network device. The apparatus has a function of implementing the third aspect and various embodiments thereof. The function may be implemented by hardware, or may be implemented by hardware executing corresponding software. The hardware or the software includes one or more modules corresponding to the function.

In a possible design, the apparatus includes a transceiver module and a processing module. The transceiver module may be, for example, at least one of a transceiver, a receiver, and a transmitter. The transceiver module may include a receiving module and a sending module, and may specifically include a radio frequency circuit or an antenna. The processing module may be a processor.

In some embodiments, the apparatus further includes a storage module, and the storage module may be, for example, a memory. When the apparatus includes the storage module, the storage module is configured to store instructions. The processing module is connected to the storage module, and may execute the instructions stored in the storage module or instructions from another module, so that the apparatus performs the method according to any one of the third aspect or the embodiments thereof.

In another possible design, when the apparatus is a chip, the chip includes a transceiver module and a processing module. The transceiver module may be, for example, an input/output interface, a pin, or a circuit in the chip. The processing module may be, for example, a processor. The processing module may execute instructions, so that the chip in the network device performs the method according to any one of the third aspect and the embodiments of the third aspect.

In some embodiments, the processing module may execute instructions in a storage module, and the storage module may be a storage module in the chip, for example, a register or a buffer. The storage module may alternatively be located inside a communications device but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the method according to the third aspect.

According to a ninth aspect, a signal transmission apparatus is provided. The apparatus may be a terminal, or a chip used for the terminal, for example, a chip that can be disposed in the terminal. The apparatus has a function of implementing the fourth aspect and various embodiments thereof. The function may be implemented by hardware, or may be implemented by hardware executing corresponding software. The hardware or the software includes one or more modules corresponding to the function.

In a possible design, the apparatus includes a processing module and a transceiver module. The transceiver module may be, for example, at least one of a transceiver, a receiver, and a transmitter. The transceiver module may include a receiving module and a sending module, and may specifically include a radio frequency circuit or an antenna. The processing module may be a processor. In some embodiments, the apparatus further includes a storage module, and the storage module may be, for example, a memory. When the apparatus includes the storage module, the storage module is configured to store instructions. The processing module is connected to the storage module. The processing module may execute the instructions stored in the storage module or other instructions, so that the apparatus performs the method according to any one of the fourth aspect and the embodiments of the fourth aspect. In this design, the apparatus may be a terminal.

In another possible design, when the apparatus is a chip, the chip includes a processing module and a transceiver module. The transceiver module may be, for example, an input/output interface, a pin, or a circuit in the chip. The processing module may be, for example, a processor. The processing module may execute instructions, so that the chip in the terminal performs the foregoing method and any possible implementation method. In some embodiments, the processing module may execute instructions in a storage module, and the storage module may be a storage module in the chip, for example, a register or a buffer. The storage module may alternatively be located inside a communications device but outside the chip, for example, a read-only memory (ROM), another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the method according to the fourth aspect and any possible implementation of the fourth aspect.

According to a tenth aspect, a signal transmission apparatus is provided. The apparatus may be a network device, or a chip used in the network device, for example, a chip that can be disposed in the network device. The apparatus has a function of implementing the fifth aspect and various embodiments of the fifth aspect. The function may be implemented by hardware, or may be implemented by hardware executing corresponding software. The hardware or the software includes one or more modules corresponding to the function.

In a possible design, the apparatus includes a transceiver module and a processing module. The transceiver module may be, for example, at least one of a transceiver, a receiver, and a transmitter. The transceiver module may include a receiving module and a sending module, and may specifically include a radio frequency circuit or an antenna. The processing module may be a processor.

In some embodiments, the apparatus further includes a storage module, and the storage module may be, for example, a memory. When the apparatus includes the storage module, the storage module is configured to store instructions. The processing module is connected to the storage module, and may execute the instructions stored in the storage module or instructions from another module, so that the apparatus performs the method according to any one of the fifth aspect or the embodiments thereof.

In another possible design, when the apparatus is a chip, the chip includes a transceiver module and a processing module. The transceiver module may be, for example, an input/output interface, a pin, or a circuit in the chip. The processing module may be, for example, a processor. The processing module may execute instructions, so that the chip in the network device performs the method according to any one of the fifth aspect and the embodiments of the fifth aspect.

In some embodiments, the processing module may execute instructions in a storage module, and the storage module may be a storage module in the chip, for example, a register or a buffer. The storage module may alternatively be located inside a communications device but outside the chip, for example, a read-only memory (ROM), another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the method according to the fifth aspect.

According to an eleventh aspect, a computer storage medium is provided. The computer storage medium stores program code. The program code is used to indicate instructions for performing the method according to the first aspect or the fourth aspect and any possible implementation thereof.

According to a twelfth aspect, a computer storage medium is provided. The computer storage medium stores program code, and the program code is used to indicate instructions for performing the method according to any one of the second aspect, the third aspect, the fifth aspect, or any possible implementation thereof.

According to a thirteenth aspect, a computer program product including instructions is provided. When the computer program product runs on a computer, the computer is enabled to perform the method according to the first aspect or the fourth aspect, or any possible implementation thereof.

According to a fourteenth aspect, a computer program product including instructions is provided. When the computer program product runs on a computer, the computer is enabled to perform the method according to any one of the second aspect, the third aspect, the fifth aspect, or any possible implementation thereof.

According to a fifteenth aspect, a communications system is provided. The communications system includes an apparatus that has a function of implementing the method and the possible designs according to the first aspect and an apparatus that has a function of implementing the method and the possible designs according to the second aspect.

According to a sixteenth aspect, a communications system is provided. The communications system includes an apparatus that has a function of implementing the method and the possible designs according to the first aspect and an apparatus that has a function of implementing the method and the possible designs according to the third aspect.

According to a seventeenth aspect, a communications system is provided. The communications system includes an apparatus that has a function of implementing the method and the possible designs according to the fourth aspect and an apparatus that has a function of implementing the method and the possible designs according to the fifth aspect.

According to an eighteenth aspect, a processor is provided. The processor is configured to be coupled to a memory, and is configured to perform the method according to the first aspect, the fourth aspect, or any possible implementation thereof.

According to a nineteenth aspect, a processor is provided. The processor is configured to be coupled to a memory, and perform the method according to the second aspect, the third aspect, the fifth aspect, or any possible implementation thereof.

Based on the foregoing technical solutions, the network device simultaneously sends the signals by using the K channel resources, and the terminal may receive the signals sent by using the K channel resources. The terminal uses the spatial reception parameters of the K channel resources as the spatial reception parameters of each interference resource of the M interference resources, then measures the first interference resource based on the spatial reception parameters of the first interference resource in the M interference resources, determines the first measurement result of the K channel resources under interference of the first interference resource, and reports the M measurement results of the M interference resources to the network device by using the measurement report, so that the network device can more accurately learn accuracy of interference from an interference resource to a channel resource.

DETAILED DESCRIPTION

Figure 1:
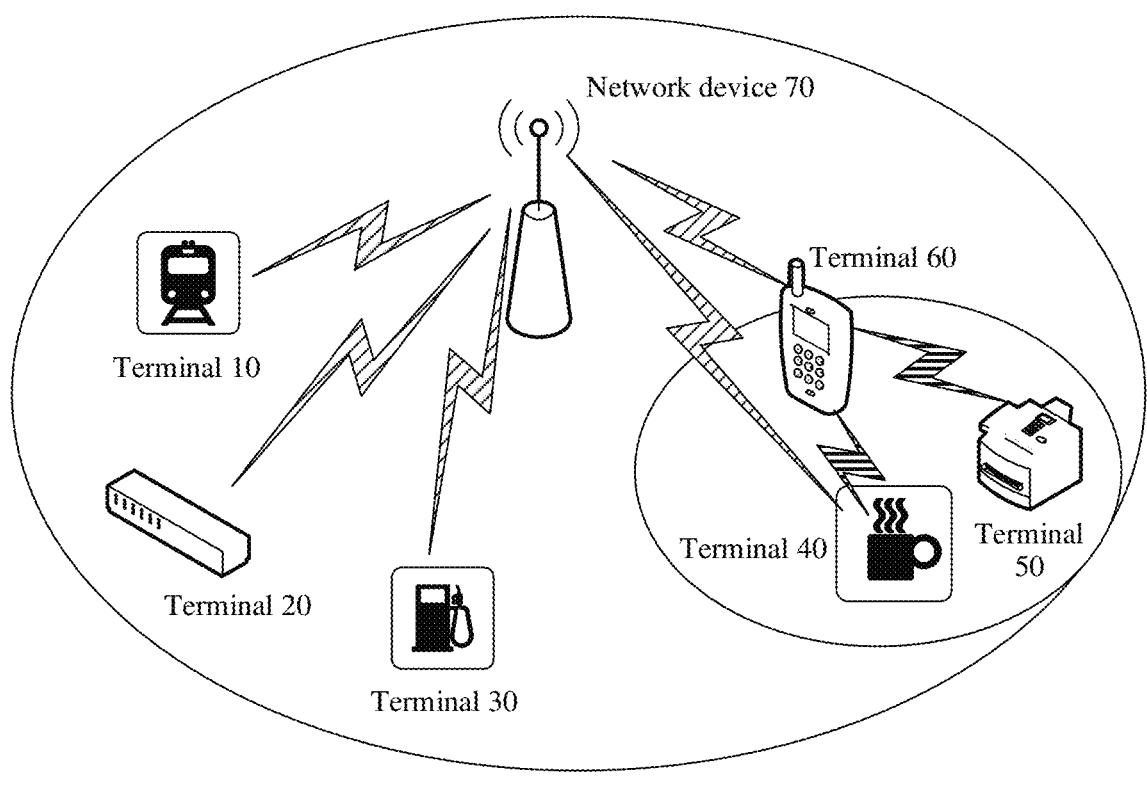
FIG. 1 is a schematic diagram of a communications system according to an embodiment of this application.

The following describes technical solutions in this application with reference to the accompanying drawings.

The following describes terms in this application in detail.

1. Beam

The beam in an NR protocol may be embodied as a spatial domain filter that is also referred to as a spatial filter or a spatial parameter. A beam used to send a signal may be referred to as a transmission beam (Tx beam), or may be referred to as a spatial domain transmission filter or a spatial transmission parameter. A beam used to receive a signal may be referred to as a reception beam (Rx beam), or may be referred to as a spatial domain receive filter or a spatial reception parameter (spatial Rx parameter).

The transmission beam may refer to distribution of signal strength formed in different directions in space after a signal is transmitted by using an antenna, and the reception beam may refer to distribution of signal strength, in different directions in space, of a radio signal received from an antenna.

In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like The beam usually corresponds to a resource. For example, during beam measurement, a network device measures different beams by using different resources, a terminal feeds back resource quality obtained through measurement, and the network device knows quality of a corresponding beam. During data transmission, beam information is also indicated through a resource corresponding to the beam information. For example, the network device indicates information about a PDSCH beam to the terminal by using a resource in a TCI of DCI.

In some embodiments, a plurality of beams that have a same communications feature or similar communications features are considered as one beam. One beam may include one or more antenna ports, configured to transmit a data channel, a control channel, a sounding signal, and the like. The one or more antenna ports forming the beam may also be considered as one antenna port set.

During beam measurement, each beam of the network device corresponds to one resource. Therefore, an index of the resource may be used to uniquely identify the beam corresponding to the resource.

2. Resource

During beam measurement, a beam corresponding to a resource may be uniquely identified through an index of the resource. The resource may be an uplink signal resource, or may be a downlink signal resource. An uplink signal includes but is not limited to a sounding reference signal (SRS) and a demodulation reference signal (DMRS). A downlink signal includes but is not limited to a channel state information reference signal (CSI-RS), a cell-specific reference signal (CS-RS), a UE-specific reference signal (user equipment-specific reference signal, US-RS), a demodulation reference signal (DMRS), and a synchronization signal/physical broadcast channel block (SS/PBCH block). The SS/PBCH block may be referred to as a synchronization signal block (SSB) for short.

The resource is configured by using radio resource control signaling. In a configuration structure, one resource is one data structure, including a related parameter of an uplink/downlink signal corresponding to the resource, for example, a type of the uplink/downlink signal, a resource element that carries the uplink/downlink signal, transmit time and a transmit periodicity of the uplink/downlink signal, and a quantity of ports used to send the uplink/downlink signal. Each resource of the uplink/downlink signal has a unique index, to identify the resource of the downlink signal. It may be understood that the index of the resource may also be referred to as an identifier of the resource. This is not limited in embodiments of this application.

3. Channel Resource

The channel resource is a resource that is reported by a terminal and used for data transmission in beam measurement.

4. Interference Resource

During interference measurement, for a specific channel resource, a terminal considers other resources as interference to the channel resource, and calculates the interference to the channel resource. These resources considered as interference are collectively referred to as interference resources.

5. Group-Based Reporting

The group-based reporting is a special reporting manner, and can be activated by configuring a group-based beam reporting parameter in measurement configuration as enabled (for example, configured as enabled). Specifically, when the group-based beam reporting parameter is configured as enabled, a terminal selects two resources that can be simultaneously received by the terminal, and reports indexes of the two resources to a network device.

6. Transmission Configuration Index (TCI)-State (State)

The TCI-state is configured by a network device for each terminal. A structure of the TCI-state is shown in FIG. 1. Each TCI-state includes an index of the TCI-state: TCI-state identity (ID), and two pieces of quasi-co-location (QCL)-information (Info). Each piece of QCL-Info includes a cell field and a bandwidth part (bwp)-ID, which indicate a specific BWP of a specific cell in which the TCI-state is used. That is, different pieces of QCL-Info can be configured for different cells or different BWPs of a same cell. The QCL-Info further includes a reference signal, used to indicate a reference signal resource with which a QCL relationship is formed. It may be understood that, in the R15 protocol, the term "beam" usually does not appear directly, and is usually replaced by another term. For example, during both data transmission and channel measurement, a beam and a reference signal resource are in a correspondence, and one beam corresponds to one reference signal resource. Therefore, a reference signal resource with which a QCL relationship is formed herein essentially means a beam with which a QCL relationship is formed. The QCL relationship means that two reference signal resources (or two antenna ports, where the antenna port and the reference signal resource are also in a one-to-one correspondence) have some same spatial parameters. Specifically, which spatial parameters are the same depends on a type of the QCL-Info, namely, another field qcl-Type of the QCL-Info. qcl-Type may have four values: {typeA, typeB, typeC, typeD}. TypeD is used as an example. TypeD indicates that the two reference signal resources have same spatial receive parameter information, that is, the two beams correspond to a same reception beam. A maximum of one of the two pieces of QCL-Info included in the TCI-state can be of TypeD.

It should be noted that, with continuous development of technologies, the terms in embodiments of this application may change, but all of them shall fall within the protection scope of this application.

The technical solutions in embodiments of this application may be used in various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communications system, a future fifth generation (5th generation, 5G) system, or a new radio (NR) system.

The terminal in embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal may alternatively be a cellular phone, a cordless phone, a Session Initiation Protocol (SIP) phone, a wireless local loop (WLL) station, a personal digital assistant (PDA), a handheld device having a wireless communications function, a computing device, another processing device connected to a wireless modem, a vehicle-mounted device, a wearable device, a terminal in a future 5G network, a terminal in a future evolved public land mobile communications network (PLMN), or the like. This is not limited in embodiments of this application.

The network device in embodiments of this application may be a device configured to communicate with the terminal. The network device may be a base transceiver station (BTS) in a global system for mobile communications (GSM) or code division multiple access (CDMA), may be a NodeB (NB) in a wideband code division multiple access (WCDMA) system, or may be an evolved NodeB (evolved NodeB, eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or one or a group of antenna panels (including a plurality of antenna panels) of a base station in a 5G system, or may be a network node that constitutes a gNB or a transmission point, for example, a baseband unit (BBU) or a distributed unit (DU). This is not limited in embodiments of this application.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implementing functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or may be classified into a network device in a core network (CN). This is not limited in this application.

In embodiments of this application, the terminal or the network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the execution body of the method provided in embodiments of this application may be the terminal or the network device, or may be a functional module that can invoke the program and execute the program in the terminal or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but are not limited to a wireless channel, and various other media that can store, include, and/or carry instructions and/or data.

FIG. 1 is a schematic diagram of a communications system according to this application. The communications system in FIG. 1 may include at least one terminal (for example, a terminal 10, a terminal 20, a terminal 30, a terminal 40, a terminal 50, and a terminal 60) and a network device 70. The network device 70 is configured to provide a communications service for the terminal and access a core network. The terminal may access a network by searching for a synchronization signal, a broadcast signal, or the like sent by the network device 70, to communicate with the network. The terminal 10, the terminal 20, the terminal 30, the terminal 40, and the terminal 60 in FIG. 1 may perform uplink and downlink transmission with the network device 70. For example, the network device 70 may send downlink signals to the terminal 10, the terminal 20, the terminal 30, the terminal 40, and the terminal 60, or may receive uplink signals sent by the terminal 10, the terminal 20, the terminal 30, the terminal 40, and the terminal 60.

In addition, the terminal 40, the terminal 50, and the terminal 60 may also be considered as a communications system. The terminal 60 may send downlink signals to the terminal 40 and the terminal 50, or may receive uplink signals sent by the terminal 40 and the terminal 50.

It should be noted that embodiments of this application may be applied to a communications system including one or more network devices, or may be applied to a communications system including one or more terminals. This is not limited in this application.

It should be understood that the communications system may include one or more network devices. One network device may send data or control signaling to one or more terminals. A plurality of network devices may simultaneously send data or control signaling to one or more terminals.

Figure 2:
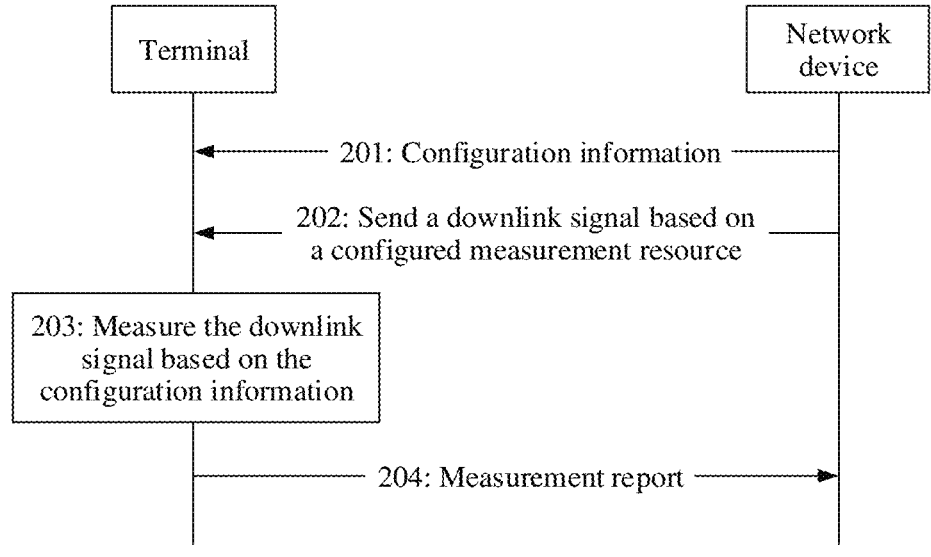
FIG. 2 is a schematic flowchart of a beam interference measurement reporting method in other approaches.

FIG. 2 is a schematic flowchart of an interference measurement reporting method in other approaches.

201: A network device sends configuration information to a terminal.

The configuration information includes resource configuration information and report configuration information. The resource configuration information includes information related to a channel resource and an interference resource. The information related to the channel resource may include a time-frequency resource location corresponding to the channel resource, a spatial reception parameter of the channel resource, and the like. The information related to the interference resource may include a time-frequency resource location corresponding to the interference resource and a spatial reception parameter of the interference resource. Alternatively, the information related to the interference resource may not include a spatial reception parameter. The network device may configure one or more resource configurations for the terminal. Each resource configuration includes one or more resource sets, and each resource set may include one or more resources. Each resource configuration/resource set/resource includes its own index, and further includes some other parameters, for example, a periodicity of a resource and a signal class corresponding to the resource. The report configuration information refers to information related to measurement result reporting. Each report configuration includes report-related information such as report time, a report periodicity, and a report quantity. In addition, the report configuration further includes an index of a resource configuration, used to indicate a resource by measuring which a reported result is obtained.

It may be understood that the channel resource may also be referred to as a channel measurement resource, and the interference resource may also be referred to as an interference measurement resource.

202: The network device sends downlink signals on a channel resource and an interference resource that are configured in the resource configuration information.

203: The terminal determines a measurement result of the channel resource under interference of the interference resource by measuring the downlink signal on the channel resource and the downlink signal on the interference resource. The measurement result may be indicated by using an SINR.

It should be understood that measuring the interference from the interference resource to the channel resource is essentially measuring interference from a signal corresponding to the interference resource to a signal corresponding to the channel resource, or interference from a transmission beam corresponding to the interference resource to a transmission beam corresponding to the channel resource.

204: The terminal sends a measurement report to the network device, where the measurement report is used to indicate the measurement result and the like.

Figure 3:
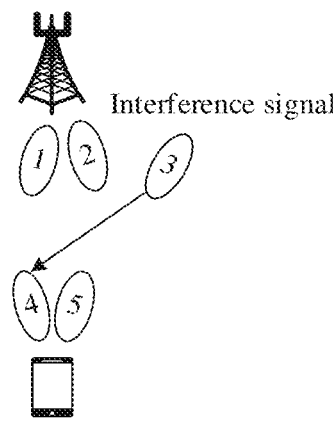
FIG. 3 is a schematic diagram of a beam interference measurement reporting method in other approaches.

In other approaches, the network device may measure interference caused by the interference resource to a single channel resource. In FIG. 3, a terminal may measure interference caused by an interference resource #3 (corresponding to a transmission beam #3) on a channel resource #1 (corresponding to a transmission beam #1). In a specific method, the same TCI-state (that is, a same spatial reception parameter, or a same reception beam) as the channel resource #1 is configured for the interference resource #3. In this way, the terminal receives downlink signals on the channel resource #1 and the interference resource #3 by using a reception beam (reception beam 4) of the channel resource #1, to calculate an SINR of the channel resource #1 under interference of the interference resource #3. However, the terminal cannot measure interference caused by an interference resource to a plurality of channel resources at the same time. For example, in FIG. 3, reception beams corresponding to the channel resource #1 and a channel resource #2 are beams #4 and #5. When the channel resources #1 and #2 are sent simultaneously, the terminal simultaneously receives the channel resources #1 and #2 by using the beams #4 and #5. In this case, the terminal simultaneously receives the interference resource #3 by using the beams #4 and #5, to measure interference caused by the interference resource #3 to the channel resources #1 and #2 at the same time. However, in other approaches, a plurality of TCI-states (or a plurality of reception beams) cannot be configured for an interference resource. Therefore, interference caused by the interference resource #3 to the channel resources #1 and #2 at the same time cannot be measured.

Figure 4:
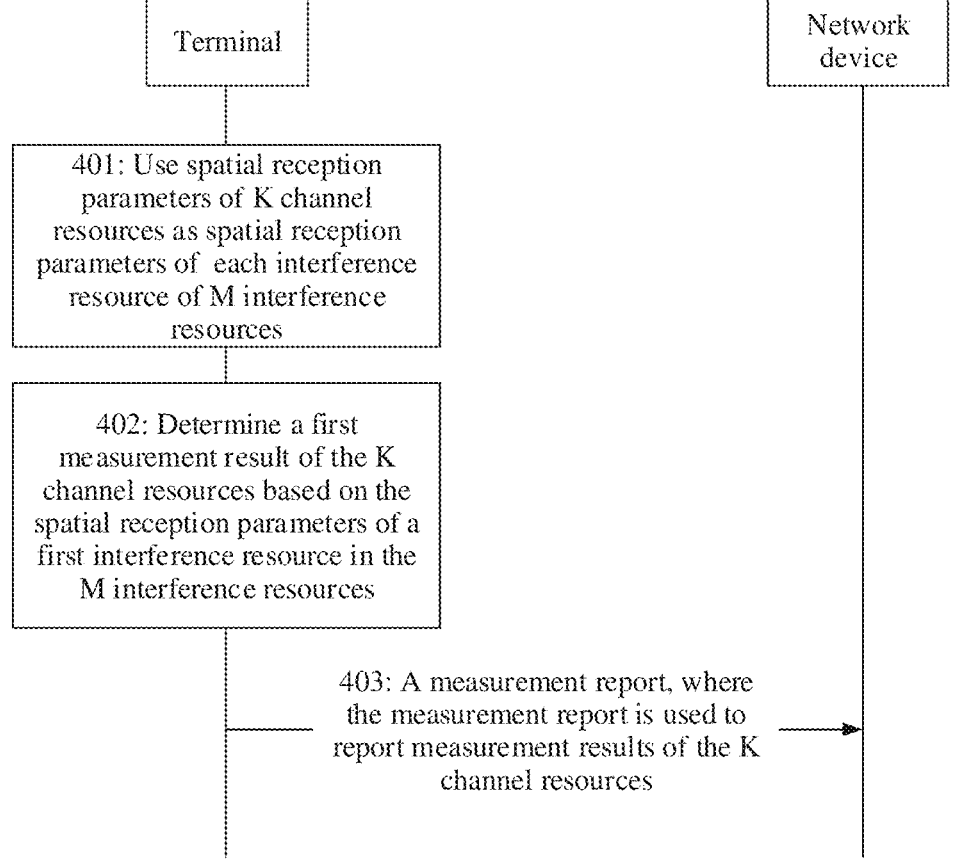
FIG. 4 is a schematic flowchart of an interference measurement reporting method according to an embodiment of this application.

FIG. 4 is a schematic flowchart of an interference measurement reporting method according to an embodiment of this application.

401: A terminal uses spatial reception parameters of K channel resources as spatial reception parameters of each interference resource of M interference resources of the terminal. The K channel resources are channel resources on which the terminal can receive signals simultaneously sent by a network device by using the K channel resources. M is a positive integer, and K is a positive integer greater than or equal to 2.

Specifically, the network device simultaneously sends the signals by using the K channel resources, and the terminal may receive the signals sent by using the K channel resources. The terminal uses the spatial reception parameters of the K channel resources as the spatial reception parameters of each interference resource of the M interference resources. If M is equal to 1, the spatial reception parameters of the K channel resources are all used as the spatial reception parameters of the interference resource.

It may be understood that the K channel resources are resources on which the terminal can simultaneously receive corresponding downlink signals (for example, CSI-RS and/or SSB resources can be received simultaneously by the UE), or on which the terminal can simultaneously receive signals sent by using the K channel resources. Specifically, that the terminal can simultaneously receive signals sent by using the K channel resources may mean that the terminal is capable of simultaneously receiving the downlink signals corresponding to the K channel resources, or the terminal is capable of simultaneously receiving transmission beams corresponding to the K channel resources. In other words, when the network device simultaneously sends the downlink signals by using the transmission beams corresponding to the channel resources, the terminal can receive all the downlink signals. For example, the transmission beams corresponding to the K channel resources correspond to a same reception beam, and the terminal may simultaneously receive, by using the reception beam, the downlink signals on the transmission beams corresponding to the K channel resources. For another example, reception beams of the transmission beams corresponding to the K channel resources are different (it is assumed that the transmission beams corresponding to the K channel resources correspond to X different reception beams). The terminal has a plurality of antenna panels, and can perform receiving by using the X different reception beams simultaneously. In this way, the terminal may simultaneously receive the downlink signals on the transmission beams corresponding to the K channel resources.

It may be understood that the K channel resources may be K transmission beams of the network device.

Using the spatial reception parameters of the K channel resources as the spatial reception parameters of one interference resource may be understood as simultaneously receiving the interference resource by using all the reception beams corresponding to the K channel resources, or may be understood as using all the reception beams corresponding to the K channel resources as reception beams of the interference resource, or may be understood as that the interference resource and the K channel resources are simultaneously QCL. All the reception beams corresponding to the K channel resources, that is, the K transmission beams of the network device, are in a one-to-one correspondence with K reception beams of the terminal.

It may be understood that K signals simultaneously sent by the network device may be received by the terminal at a same moment, or may be received at different moments. This is not limited in this application.

It may be further understood that the terminal may receive the signals of the K channel resources by using one or more channel resources. This is not limited herein.

It may be further understood that a type of the channel resource may be non-zero power channel state information reference signal-resource (NZP-CSI-RS-resource), or synchronization signal and physical broadcast channel block (synchronization signal and PBCH block, SSB). A type of the interference resource may be NZP-CSI-RS-resource, or may be channel state information interference measurement (CSI-IM)-resource, or may be a mixture of the two. That is, a part of the interference resource is NZP-CSI-RS-resource, and a part of the interference resource is CSI-IM-resource.

The K channel resources may be selected from N channel resources that are configured in measurement configuration information corresponding to a current measurement, or may be directly configured in the measurement configuration information corresponding to the current measurement. These two cases correspond to two embodiments respectively.

In a first embodiment, the K channel resources are K channel resources that are determined from the N channel resources and that can be simultaneously received by the terminal. Determining the K channel resources and measuring the M interference resources by using the spatial reception parameters of the K channel resources are completed in a same measurement reporting process. Specifically, in a measurement reporting process, the network device configures the N channel resources and the M interference resources by using the measurement configuration information. The terminal first selects, from the N channel resources, the K channel resources that can be simultaneously received by the terminal, and then uses the spatial reception parameters of the K channel resources as the spatial reception parameters of each interference resource of the M interference resources, to measure the M interference resources.

It may be understood that the N channel resources may be configured in a same resource setting (resourcesetting), or may be configured in different resource settings. Alternatively, the N channel resources may be configured in a same resource set (resourceset), or may be configured in different resource sets.

Similarly, the M interference resources may be configured in a same resource setting, or may be configured in different resource settings. Alternatively, the M interference resources may be configured in a same resource set, or may be configured in different resource sets.

It may be further understood that the N channel resources and the M interference resources may be configured in a same resource setting or a same resource set, or configured in different resource settings or different resource sets. This is not limited in this application.

It may be further understood that the resource setting may also be referred to as resource configuration.

In some embodiments, the configuration information is further used to configure a spatial reception parameter of each channel resource of the N channel resources.

It may be understood that the spatial reception parameters of the N channel resources may be different from each other, may be the same, or may be partially the same. This is not limited in this application.

It may be further understood that a group-based beam reporting parameter and/or a report quantity parameter may be further configured in the configuration information. The group-based beam reporting parameter is used to indicate whether to report measurement results of K channel resources that can be simultaneously received by the terminal. If the group-based beam reporting parameter indicates enabled (for example, configured as enabled), the terminal reports, in a group-based reporting manner, the measurement results of K channel resources that can be simultaneously received by the terminal. If the group-based beam reporting parameter indicates disabled (for example, configured as disabled), the terminal does not perform reporting in a group-based reporting manner. The report quantity parameter is used to indicate content included in a report result, for example, a reference signal received power (RSRP) and an SINR.

It may be understood that names of the group-based beam reporting parameter and the report quantity parameter are not limited in embodiments of this application, and the group-based beam reporting parameter and the report quantity parameter may alternatively have other names.

In some embodiments, time corresponding to the N channel resources is earlier than time corresponding to the M interference resources.

Specifically, time corresponding to a resource (a channel resource or an interference resource) is time at which a downlink signal corresponding to the resource is sent, and the time may be indicated by using a time-frequency resource mapping parameter in the resource. The time may be expressed as an orthogonal frequency division multiplexing (OFDM) symbol, a slot, a millisecond, or the like. The time corresponding to the N channel resources being earlier than the time corresponding to the M interference resources may mean that the latest time in the time corresponding to the N channel resources is earlier than the earliest time in the time corresponding to the M interference resources.

Further, the time corresponding to the N channel resources being earlier than the time corresponding to the M interference resources may specifically mean that the time corresponding to the N channel resources may be X time units earlier than the time corresponding to the M interference resources. For example, the latest time in the time corresponding to the N channel resources is X time units earlier than the earliest time in the time corresponding to the M interference resources. A unit of time may be an OFDM symbol, a slot, or the like. For example, the latest time in the time corresponding to the N channel resources is X symbols earlier than the earliest time in the time corresponding to the M interference resources. That is, an OFDM symbol corresponding to a channel resource with the latest time in the N channel resources is X symbols earlier than an OFDM symbol corresponding to a resource with the earliest time in the M interference resources. In other words, an interval between an OFDM symbol (symbol j) corresponding to a resource with the earliest time in the M interference resources and an OFDM symbol (symbol i) corresponding to a channel resource with the latest time in the N channel resources is at least X symbols, for example, $j-i \geq X$.

In some embodiments, the time corresponding to the N channel resources being earlier than the time corresponding to the M interference resources may specifically mean that the earliest time in the time corresponding to the N channel resources is X time units earlier than the earliest time in the time corresponding to the M interference resources, or the earliest time in the time corresponding to the N channel resources is X time units earlier than the latest time in the time corresponding to the M interference resources, or the latest time in the time corresponding to the N channel resources is X time units earlier than the latest time in the time corresponding to the M interference resources.

It may be understood that a value of X may be a default value specified in a protocol, or may be reported by the terminal to the network device (for example, reported to the network device in a terminal capability reporting process), or may be a value indicated by the network device by using radio resource control (RRC) signaling, media access control (MAC)-control element (CE) information, or downlink control information (DCI). This is not limited in this application.

It may be further understood that the time unit may be a symbol, a slot, a subframe, a frame, a millisecond, a microsecond, Ts, or Tc.

In some embodiments, a first condition may be used, and only when the condition is met, the method in the first embodiment of step 401 is used to determine a spatial reception parameter of an interference resource. That is, only when the condition is met, the spatial reception parameters of the K channel resources that are determined from the N channel resources and that can be simultaneously received by the terminal are used as the spatial reception parameters of each interference resource of the M interference resources. The condition may be one of the following items. The following items are all applicable to the measurement configuration information.

The group-based beam reporting parameter in the measurement configuration information indicates enabled. For example, the group-based beam reporting parameter is configured as enabled.

The reported content indicated by the report quantity parameter in the measurement configuration information includes the SINR. For example, the report quantity parameter is configured as cri-SINR, ssb-Index-SINR, or any other form containing an SINR.

An interference resource is configured in the measurement configuration information. That is, not only a channel resource is configured.

The interference resource is configured in the measurement configuration information, and no TCI-state parameter is configured for the interference resource.

The time corresponding to the N channel resources configured in the measurement configuration information is X OFDM symbols earlier than the time corresponding to the M interference resources. For example, time corresponding to the channel resource with the latest time in the N channel resources is X OFDM symbols earlier than the time corresponding to the interference resource with the latest time in the M interference resources.

The foregoing condition may alternatively be a combination of the foregoing plurality of items. That is, only when the plurality of items are all met, the spatial reception parameters of the K channel resources are used as the spatial reception parameters of each interference resource of the M interference resources. The foregoing condition may be a combination of the following items.

The group-based beam reporting parameter in the measurement configuration information indicates enabled, and the reported content indicated by the report quantity parameter includes the SINR.

The group-based beam reporting parameter in the measurement configuration information indicates enabled, and the interference resource is configured in the configuration information.

The group-based beam reporting parameter in the measurement configuration information indicates enabled, the interference resource is configured in the measurement configuration information, and no TCI-state parameter is configured for the interference resource.

The group-based beam reporting parameter in the measurement configuration information indicates enabled, and the time corresponding to the configured N channel resources is X OFDM symbols earlier than the time corresponding to the configured M interference resources.

The group-based beam reporting parameter in the measurement configuration information indicates enabled, the reported content indicated by the report quantity parameter includes the SINR, and the time corresponding to the configured N channel resources is X OFDM symbols earlier than the time corresponding to the configured M interference resources.

The group-based beam reporting parameter in the measurement configuration information indicates enabled, the interference resource is configured in the measurement configuration information, and the time corresponding to the configured N channel resources is X OFDM symbols earlier than the time corresponding to the configured M interference resources.

The group-based beam reporting parameter in the measurement configuration information indicates enabled. The interference resource is configured in the measurement configuration information, and no TCI-state parameter is configured for the interference resource. The time corresponding to the configured N channel resources is X OFDM symbols earlier than the time corresponding to the configured M interference resources.

In a second embodiment, the K channel resources are directly configured, instead of being determined from the configured N channel resources. That is, the network device configures the K channel resources and the M interference resources. The terminal measures the M interference resources by using the spatial reception parameters of the K channel resources as the spatial reception parameters of each interference resource of the M interference resources.

Specifically, the terminal receives first measurement configuration information from the network device. The first measurement configuration information includes the K channel resources and the M interference resources. The terminal uses the spatial reception parameters of the K channel resources as the spatial reception parameters of each interference resource of the M interference resources. The K channel resources may be simultaneously received by the terminal. That is, when the network device has learned of the K channel resources that can be simultaneously received by the terminal device, for example, has determined, by using another measurement process, the K channel resources that can be simultaneously received by the terminal, the network device may directly perform measurement through the foregoing configuration without configuring the N channel resources for the terminal to first select the K channel resources that can be simultaneously received by the terminal, and use the spatial reception parameters of the K channel resources as the spatial parameters of each of the M interference resources to measure the M interference resources.

It may be understood that when the K channel resources cannot be simultaneously received by the terminal, the terminal may also measure the M interference resources by using the spatial reception parameters of the K channel resources as the spatial reception parameters of each interference resource of the M interference resources. This is not limited in this application.

In some embodiments, a second condition may be used, and only when the second condition is met, the method in the second embodiment of step 401 is used to determine a spatial reception parameter of an interference resource. That is, only when the second condition is met, the spatial reception parameters of the configured K channel resources are used as the spatial reception parameters of each interference resource of the M interference resources. The second condition may be any one of the following items. The following items are all applicable to the first measurement configuration information.

The group-based beam reporting parameter in the first measurement configuration information indicates enabled, and the reported content indicated by a report quantity parameter includes the SINR. For example, the report quantity parameter is configured as cri-SINR, ssb-Index-SINR, or any other form containing an SINR.

The group-based beam reporting parameter in the first measurement configuration information indicates enabled, and an interference resource is configured in the first configuration information.

The group-based beam reporting parameter in the first measurement configuration information indicates enabled, the interference resource is configured in the first measurement configuration information, and no TCI-state parameter is configured for the interference resource.

In some embodiments, the terminal may alternatively perform the foregoing method directly by default without the second condition.

In some embodiments, the K channel resources that can be simultaneously received by the terminal are determined by using another measurement process. In other words, before the current measurement, that is, before the measurement performed based on the first measurement configuration information, the terminal has performed one measurement. For example, the terminal receives second measurement configuration information from the network device. The N channel resources are configured in the second measurement configuration information. The terminal determines, from the N channel resources based on the second measurement configuration information, the K channel resources that can be simultaneously received by the terminal, and reports indexes of the K channel resources to the network device, so that the network device can learn of the K channel resources.

In some embodiments, a third condition may be used. When the third condition is met, the terminal determines, from the N channel resources configured in the second measurement configuration information, the K channel resources that can be simultaneously received by the terminal. The third condition may be any one of the following items. The following items are all applicable to the second measurement configuration information.

The group-based beam reporting parameter in the second measurement configuration information indicates enabled, and the reported content indicated by a report quantity parameter includes an RSRP. For example, the report quantity parameter is configured as cri-RSRP, ssb-Index-RSRP, or another form containing an RSRP.

The group-based beam reporting parameter in the second measurement configuration information indicates enabled, and no interference resource is configured in the second configuration information.

In some embodiments, when configuring an interference resource for the terminal by using measurement configuration information, the network device refers to a capability limitation of the terminal, that is, a maximum quantity of interference resources that can be supported by the terminal. The terminal may report, by using a terminal capability reporting process, a capability of the terminal in terms of an interference resource, for example, a maximum quantity of interference resources that can be measured by the terminal in one slot. Specifically, the terminal may report any one or more of the following terminal capabilities.

Specifically, the maximum quantity of interference resources may be: a maximum quantity of interference resources that can be configured in one cell; a maximum quantity of interference resources that can be configured in one BWP; a maximum quantity of interference resources that can be configured in all cells; a maximum quantity of interference resources that can be configured on one OFDM symbol; a maximum quantity of interference resources that can be configured in one slot; a maximum quantity of interference resources that can be configured in one resource setting; a maximum quantity of resources that can be configured in one resource set; a maximum quantity of interference resources associated with one reportconfig; a maximum quantity of interference resources associated with one channel resource; a maximum quantity of interference resources associated with one channel resource set (resourceset); and a maximum quantity of interference resources associated with one channel resource configuration (resourceconfig).

It may be understood that the foregoing maximum quantities may be a maximum quantity of interference resources whose type is NZP CSI-RS, or may be a maximum quantity of interference resources whose type is CSI-IM, or may be a maximum quantity of interference resources whose type is NZP CSI-RS and interference resources whose type is CSI-IM.

402: The terminal determines a first measurement result of the K channel resources based on the spatial reception parameters of a first interference resource in the M interference resources.

Specifically, the terminal measures the first interference resource based on the spatial reception parameters of the first interference resource in the M interference resources, and determines the first measurement result of the K channel resources under interference of the first interference resource. The first interference resource is any one of the M interference resources. In other words, the terminal may measure each interference resource in the M interference resources, and determine a measurement result of the K channel resources under interference of each interference resource. That is, the terminal may determine M measurement results corresponding to the M interference resources.

For example, an example in which a spatial reception parameter includes a TCI-state is used for description. The spatial reception parameters of the K channel resources are a TCI-state 1 and a TCI-state 2. In this case, any one of the M interference resources is measured by using the TCI-state 1 and the TCI-state 2.

It may be understood that the terminal may determine one or more measurement results of the K channel resources based on one interference resource. For example, the terminal may determine two measurement results of two channel resources under interference of one interference resource, or an average value of the two measurement results. When M is equal to 1, the terminal may report one group of measurement results. When M is greater than 1, the terminal may report M groups of measurement results.

It may be further understood that a measurement result in this application may be an SINR, or may be an RSRP, a CQI, or reference signal receiving quality (RSRQ). This is not limited in this application. When the measurement result is an SINR, the SINR may alternatively be an L1-SINR.

In some embodiments, the measurement result may be calculated by using the following method. The SINR is used as an example.

Specifically, for example, there is one interference resource i and two channel resources (a resource 1 and a resource 2), that is, K=2. The terminal receives, by using spatial reception parameters of the resource 1 and the resource 2, a downlink signal corresponding to the interference resource i, and obtains interference energy through measurement. The terminal receives a downlink signal corresponding to the resource 1 by using the spatial reception parameter of the resource 1, and obtains signal energy P1 through measurement. P1 may alternatively be signal energy obtained through measurement when the downlink signal corresponding to the resource 1 is received by using the spatial reception parameters of both the resource 1 and the resource 2. The terminal receives a downlink signal corresponding to the resource 2 by using the spatial reception parameter of the resource 2, and obtains signal energy P2 through measurement. P2 may alternatively be signal energy obtained through measurement when the downlink signal corresponding to the resource 2 is received by using the spatial reception parameters of both the resource 1 and the resource 2. The following uses the resource 1 as an example for description of a calculation method of the SINR.

An SINR of the resource 1 under interference of an interference resource 1 may be calculated according to the following formula:

$$SINR_1 = \frac{P_1}{I_i + N_0}$$

$N_0$ is other interference energy, for example, noise and neighboring cell interference.

The SINR of the resource 1 under interference of the interference resource 1 may alternatively be calculated according to the following formula:

$$SINR_1 = \frac{P_1}{P_{21} + I_i + N_0}$$

$P_{21}$ is energy of the resource 2 that is obtained through measurement by receiving the resource 2 by using the spatial reception parameter of the resource 1. That is, $P_{21}$ is the energy leaked from the resource 2 to a reception beam of the resource 1. The energy causes interference to a signal on the resource 1. Therefore, the interference by the energy is considered into entire interference.

That is, in a group-based reporting mode (for example, when the first condition is met), when an SINR of a resource j in K resources (the K resources may be the K configured channel resources, or K to-be-reported channel resources that can be simultaneously received) is measured, signal energy of other resources in the K resources is separately measured by using a spatial reception parameter of the resource j, and the signal energy of the other resources is separately used as interference to calculate the SINR of the resource j. Alternatively, all of the signal energy of the other resources is used as interference to calculate the SINR of the resource j. The resource j is any one of the K resources.

In some embodiments, in the foregoing calculation method, interference from all the M interference resources to the K channel resources may alternatively be calculated. That is, interference energy in the M interference resources is added to calculate the interference energy of the K resources. The resource 1 is still used as an example. The following calculation method is used:

$$SINR_1 = \frac{P_1}{I + N_0}$$

or $$SINR_1 = \frac{P_1}{P_{21} + I + N_0}$$

I is a sum of the interference energy of all the M interference resources.

The SINR measurement result may be used to determine the K to-be-reported channel resources that can be simultaneously received. For example, a group of channel resources with a maximum equivalent SINR is selected from a plurality of groups (K channel resources in each group) of channel resources that can be simultaneously received. The equivalent SINR refers to a maximum value, a minimum value, an average value, a sum, and the like in SINRs of the K channel resources. The equivalent SINR may alternatively be an SINR calculated by using another calculation method. Alternatively, an equivalent SINR threshold may be used. When there is no group of SINRs exceeding the threshold, no measurement result is reported, or a special value is reported.

403: The terminal sends a measurement report to the network device, where the measurement report is used to indicate measurement results of the K channel resources, and includes the first measurement result.

Specifically, the measurement report may be used to indicate the M measurement results.

In a possible implementation, the measurement report includes the M measurement results, and each measurement result corresponds to one interference resource. Each of the M measurement results includes an index of a corresponding channel resource.

Specifically, the terminal may directly report the M measurement results to the network device, and use each measurement result to carry the index of the corresponding interference resource. In this way, the network device may identify an interference resource corresponding to each measurement result of the K channel resources.

In another possible implementation, the measurement report includes the M measurement results, the M measurement results are sorted in a first order, and the first order is a preset interference channel resource index order or a configuration order of the K interference resources.

Specifically, the terminal may directly report the M measurement results to the network device. The M measurement results are sorted in the first order, and the first order is the preset interference resource index order or the configuration order of the at least K interference resources. In this way, the network device may also identify the interference resource corresponding to each measurement result of the K channel resources.

In still another possible implementation, when L SINRs are to be reported, a largest SINR or a smallest SINR in the L SINRs, and a difference between other L−1 SINRs and the largest SINR or smallest SINR may be reported. The foregoing largest or smallest SINR may be referred to as a reference SINR. In a reporting format, the reference SINR uses Q bits, and each SINR difference uses R bits. The R bits may indicate $2^R$ different values. For example, when R is equal to 4, R may indicate 16 values. A difference between two adjacent values is referred to as a quantization step. For example, if 0000 indicates 1 dB, 0001 indicates 2 dB, and a difference is 1 dB, a quantization step of the SINR difference is 1 dB.

In embodiments of this application, a value of the step of the SINR difference may have a mapping relationship with a first SINR. That is, a plurality of SINR intervals may be specified, and each SINR interval uses one step. For example, as shown in the following Table 1, when the value of the reference SINR is greater than 20 dB, the step is 2 dB. When the reference SINR is between 10 dB and 20 dB, the step is 1.5 dB. When the reference SINR is between 5 dB and 10 dB, the step is 1 dB. If the reference SINR is less than 5 dB, the step is 0.5 dB.

TABLE 1

| Reference SINR | Step |
| --- | --- |
| >20 dB | 2 dB |
| 10 dB to 20 dB | 1.5 dB |
| 5 dB to 10 dB | 1 dB |
| <5 dB | 0.5 dB |

Figure 5:
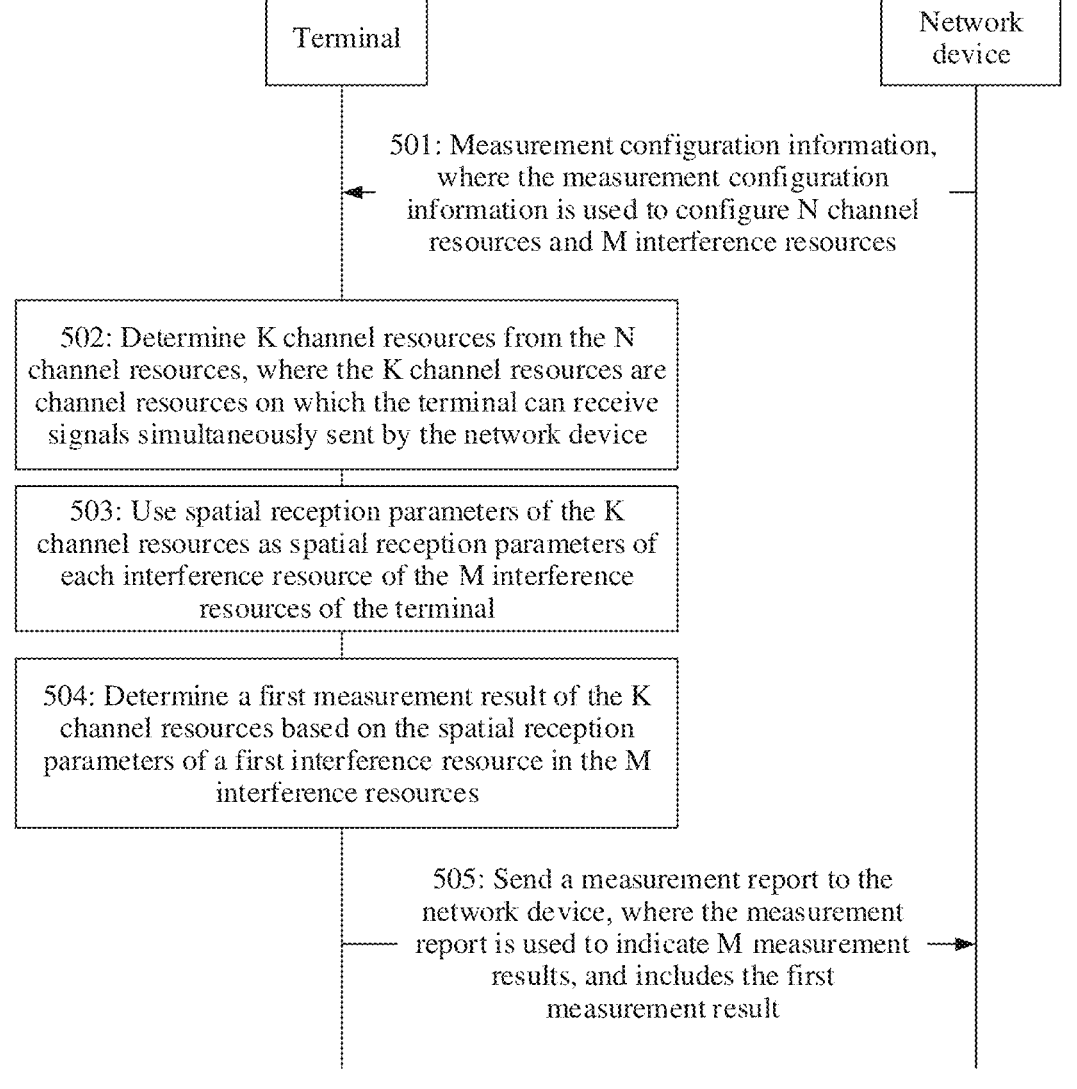
FIG. 5 is a schematic diagram of an interference measurement reporting method according to a specific embodiment of this application.

FIG. 5 is a schematic flowchart of an interference measurement reporting method according to a specific embodiment of this application.

It should be noted that meanings of same terms in this embodiment of this application are the same as those in the embodiment shown in FIG. 4. To avoid repetition, details are not described herein again.

501: A network device sends measurement configuration information to a terminal, where the measurement configuration information is used to configure N channel resources and M interference resources.

502: The terminal determines K channel resources from the N channel resources, where the K channel resources are channel resources on which the terminal can receive signals simultaneously sent by the network device.

503: The terminal uses spatial reception parameters of the K channel resources as spatial reception parameters of each interference resource of the M interference resources of the terminal.

504: The terminal determines a first measurement result of the K channel resources based on the spatial reception parameters of a first interference resource in the M interference resources.

505: The terminal sends a measurement report to the network device, where the measurement report is used to indicate M measurement results, and includes the first measurement result.

Figure 6:
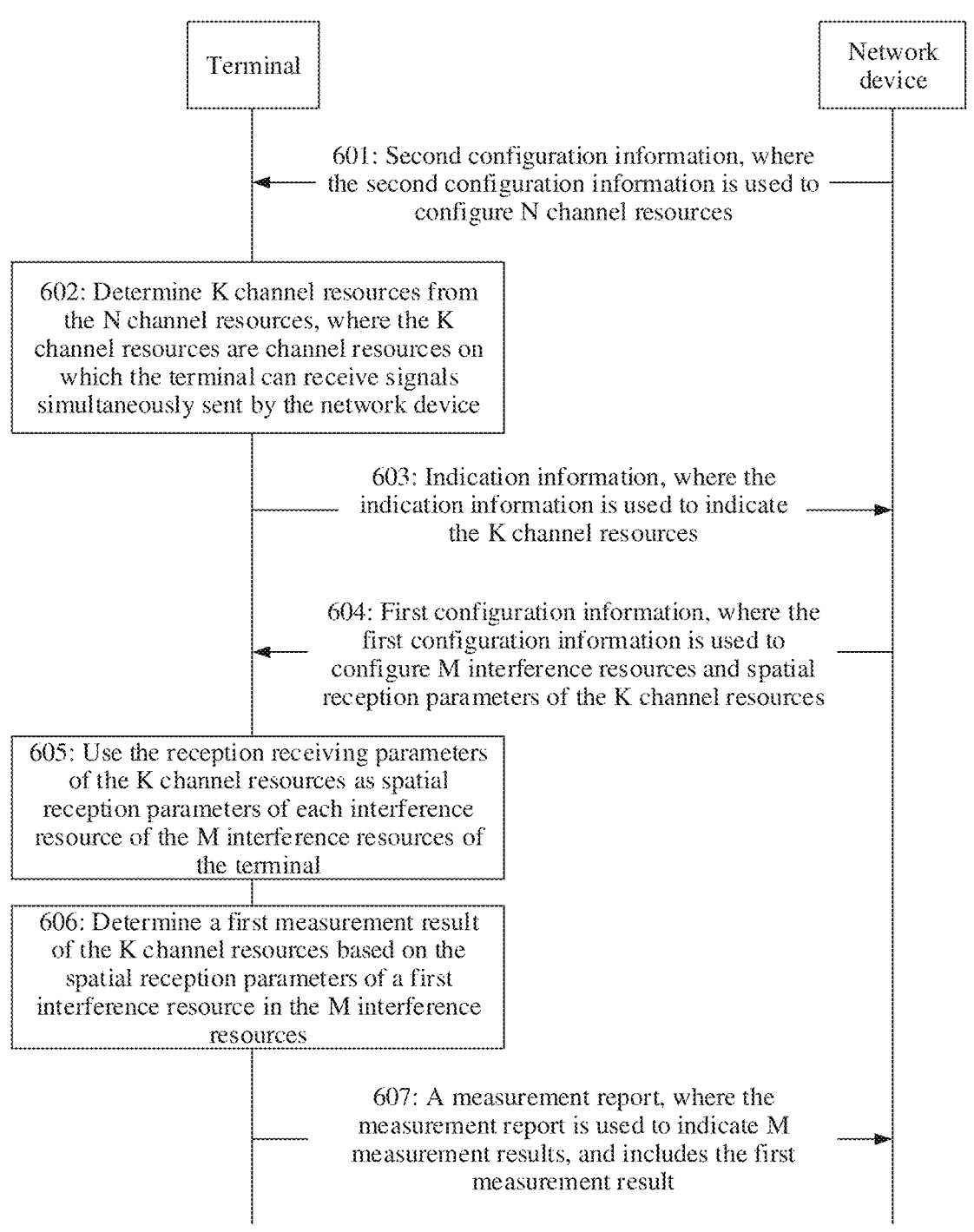
FIG. 6 is a schematic diagram of an interference measurement reporting method according to another specific embodiment of this application.

FIG. 6 is a schematic flowchart of an interference measurement reporting method according to a specific embodiment of this application.

It should be noted that meanings of same terms in this embodiment of this application are the same as those in the embodiment shown in FIG. 4. To avoid repetition, details are not described herein again.

601: A terminal receives second configuration information from a network device, where the second configuration information is used to configure N channel resources.

602: The terminal determines K channel resources from the N channel resources, where the K channel resources are channel resources on which the terminal can receive signals simultaneously sent by the network device.

603: The terminal sends indication information to the network device, where the indication information is used to indicate the K channel resources.

604: The terminal receives first configuration information from the network device, where the first configuration information is used to configure M interference resources and spatial receiving parameters of the K channel resources.

605: The terminal uses the spatial reception parameters of the K channel resources as spatial reception parameters of each interference resource of the M interference resources of the terminal.

606: The terminal determines a first measurement result of the K channel resources based on the spatial reception parameters of a first interference resource in the M interference resources.

607: The terminal sends a measurement report to the network device, where the measurement report is used to indicate M measurement results, and includes the first measurement result.

Figure 7:
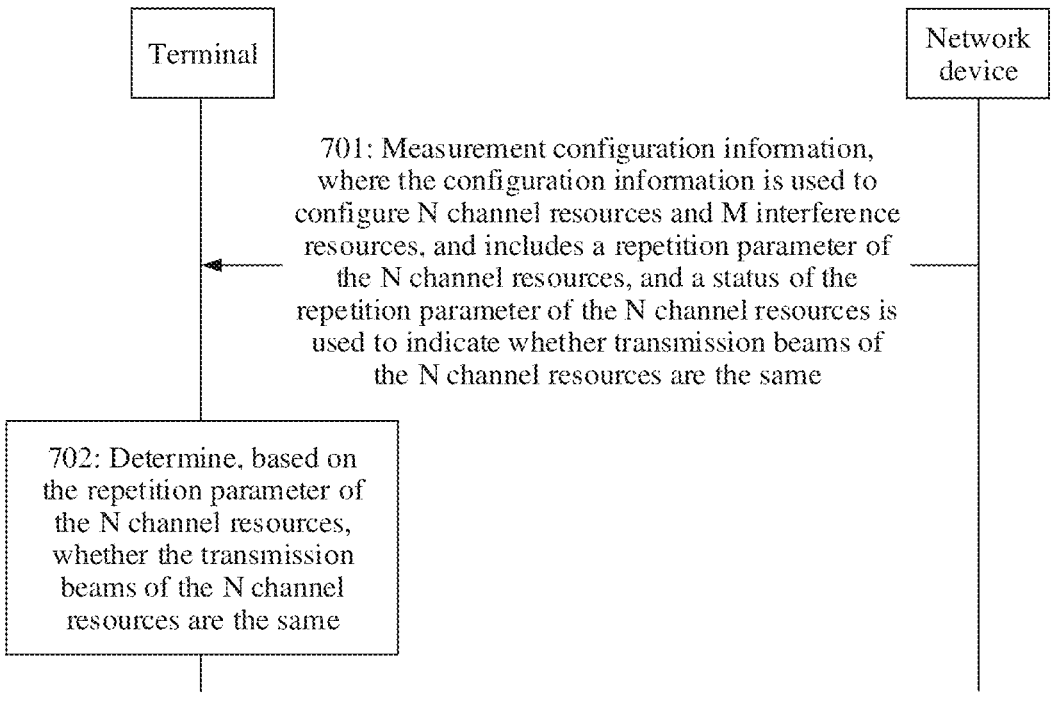
FIG. 7 is a schematic diagram of an interference measurement reporting method according to another specific embodiment of this application.

FIG. 7 is a schematic flowchart of a method for determining a transmission beam of a channel resource according to an embodiment of this application.

701: A network device sends measurement configuration information to a terminal, where the measurement configuration information is used to configure N channel resources and M interference resources, and includes a repetition parameter of the N channel resources. A status of the repetition parameter of the N channel resources indicates whether transmission beams of the N channel resources are the same.

702: The terminal determines, based on the repetition parameter of the N channel resources, whether the transmission beams of the N channel resources are the same.

Specifically, the network device may indicate, by using the repetition parameter, whether the channel resources and the interference resources are sent by using one transmission beam.

It may be understood that, the transmission beams of the N channel resources being the same may mean that the N channel resources send signals on different time domain resources by using a same beam.

In some embodiments, a first status of the repetition parameter of the N channel resources indicates that the transmission beams of the N channel resources are the same, and a second status of the repetition parameter of the N channel resources indicates that the transmission beams of the N channel resources are different.

For example, a channel resource set (for example, NZP-CSI-RS-resourceset) and an interference resource set (resourceset) are configured in the measurement configuration information. The channel resource set includes the N channel resources, and the interference resource set includes the M interference resources. When the repetition parameter of the channel resource set is configured to be in an enabled state (for example, configured as "on"), the terminal considers that the N channel resources are sent on N different OFDM symbols by using a same transmission beam. On the contrary, when the repetition parameter of the channel resource set is configured to be in a disabled state (for example, configured as "off"), the terminal should not consider that the N channel resources are sent by using a same transmission beam.

In some embodiments, the configuration information may further include a repetition parameter of the M interference resources, and a status of the repetition parameter of the M interference resources indicates whether transmission beams of the M interference resources are the same.

Specifically, when the repetition parameter of the interference resource set is configured to be in an enabled state (for example, configured as "on"), the terminal considers that the M interference resources are sent on M different OFDM symbols by using a same transmission beam. On the contrary, when the repetition parameter of the interference resource set is configured to be in a disabled state (for example, configured as "off"), the terminal should not consider that the M interference resources are sent by using a same transmission beam.

It may be understood that a magnitude relationship between N and M is not limited in this application. For example, N may be greater than M, or equal to M, or less than M.

In some embodiments, when the first status of the repetition parameter of the N channel resources indicates that transmission beams of the N channel resources are the same and transmission beams of the M interference resources are different, a measurement report includes at least one measurement result and an index of a channel resource corresponding to the at least one measurement result.

Specifically, when the repetition parameter of the channel resource set is configured as enabled (for example, configured as "on") and the repetition parameter of the interference resource set is configured as disabled (for example, configured as "off"), the terminal considers that the N channel resources use a same transmission beam, and the M interference resources do not necessarily use a same transmission beam. In this case, the terminal reports an index of a channel resource when reporting a measurement result by using the measurement report. That is, if the network device configures a channel resource set (resourceSet) and a corresponding interference measurement resource set for the terminal, a repetition parameter of the channel resource set is configured to be in an enabled state (for example, configured as "on"), and a repetition parameter of the interference measurement resource set is configured to be in a disabled state (for example, configured as "off"), the terminal reports the index of the channel resource. The index of the channel resource is associated with an index of an interference resource, and the index of the interference resource may be determined by using the index of the channel resource. That is, when the terminal device wants to report an index of an interference resource, the terminal device may not directly report the index of the interference resource, but report an index of a channel resource associated with the interference resource. Alternatively, in this case, the terminal device may directly report an index of an interference resource when reporting a measurement result by using the measurement report. That is, if the network device configures a channel resource set and a corresponding interference measurement resource set for the terminal, a repetition parameter of the channel resource set is configured to be in an enabled state (for example, configured as "on"), and a repetition parameter of the interference measurement resource set is configured to be in a disabled state (for example, configured as "off"), the terminal reports the index of the interference resource.

A beneficial effect of the foregoing method is that when N is equal to M, the N channel resources are in a one-to-one correspondence with the N interference resources. The terminal may report an index of a channel resource to obtain information about an interference resource, that is, an interference resource corresponding to each reported SINR, so that data transmission performance can be improved.

It should be noted that when the repetition parameters of both the channel resource set and the interference resource set are configured as enabled (for example, configured as "on"), the terminal considers that the N channel resources use a same transmission beam and the M interference resources use a same transmission beam. In this case, the terminal does not report an index of a channel resource when reporting an interference measurement result. This is because the channel resource and the interference resource each correspond to only one beam, and an index of the resource is not reported to indicate a beam to which the measurement result corresponds. That is, if the network device configures a channel resource set and a corresponding interference measurement resource set for the terminal, and repetition parameters of both the channel resource set and the interference measurement resource set are configured to be in an enabled state (for example, configured as "on"), the terminal does not report the index of the channel resource. Alternatively, if the network device configures a channel resource set and a corresponding interference measurement resource set for the terminal, and repetition parameters of both the channel resource set and the interference measurement resource set are configured to be in an enabled state (for example, configured as "on"), the terminal does not report the index of the channel resource or an index of an interference resource. Reporting overheads can be reduced by using the foregoing method.

In another implementation, it may be directly specified that an interference resource set uses a same repetition parameter value as a channel resource set associated with the interference resource set. Alternatively, when the interference resource set uses a value of a configured repetition parameter, the interference resource set uses a value of a same repetition parameter of the channel resource set associated with the interference resource set. For example, when the repetition parameter of the channel resource set is configured as enabled (for example, configured as "on"), but no repetition parameter of the interference resource set associated with the channel resource set is configured, the terminal may consider that the interference resource set is also sent by using a single transmission beam. In this case, the terminal also does not report the index of the channel resource. Specifically, if the network device configures a channel resource set and a corresponding interference measurement resource set for the terminal device, and if a repetition parameter of the channel resource set is configured as enabled (for example, configured as "on"), and no repetition parameter is configured for the interference measurement resource set, the terminal device does not report the index of the channel resource.

Embodiments described in this specification may be independent solutions, or may be combined based on internal logic. These solutions all fall within the protection scope of this application.

It may be understood that, in the foregoing method embodiments, the methods and the operations implemented by the terminal may alternatively be implemented by a component (for example, a chip or a circuit) used in the terminal, and the methods and the operations implemented by the network device may alternatively be implemented by a component (for example, a chip or a circuit) used in the network device.

The foregoing mainly describes the solutions provided in embodiments of this application from a perspective of interaction. It may be understood that to implement the foregoing functions, each network element, such as the terminal or the network device, includes a corresponding hardware structure and/or software module for performing each function. A person skilled in the art may be aware that, with reference to the examples described in embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the terminal or the network device may be divided based on the foregoing method examples. For example, each functional module may be divided to correspond to each function, or two or more functions may be integrated into one processing module. The integrated module may be implemented in a form of hardware, or may be implemented in a form of a software functional module. It should be noted that in embodiments of this application, division into the modules is an example and is merely logical function division, and may be other division in an actual implementation. An example in which each functional module is obtained through division based on a corresponding function is used below for description.

It should be understood that specific examples in embodiments of this application are merely intended to help a person skilled in the art better understand embodiments of this application, but are not intended to limit the scope of embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

The methods provided in embodiments of this application are described above in detail with reference to FIG. 4 to FIG. 7. The following describes in detail apparatuses provided in embodiments of this application with reference to FIG. 8 to FIG. 15. It should be understood that descriptions of the apparatus embodiments correspond to the descriptions of the method embodiments. Therefore, for content not described in detail, refer to the foregoing method embodiments. For brevity, details are not described herein again.

Figure 8:
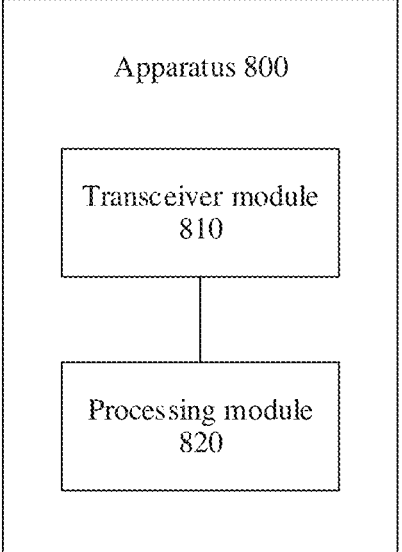
FIG. 8 is a schematic block diagram of a communications apparatus according to an embodiment of this application.

FIG. 8 is a schematic block diagram of a communications apparatus 800 according to an embodiment of this application.

It should be understood that the apparatus 800 may be corresponding to each terminal shown in FIG. 1 or the chip in the terminal shown in FIG. 4, and may have any function of the terminal in the method embodiment shown in FIG. 4. The apparatus 800 includes a transceiver module 810 and a processing module 820.

The processing module 820 is configured to use spatial reception parameters of K channel resources as spatial reception parameters of each interference resource of M interference resources of the terminal. The K channel resources are channel resources on which the terminal can receive signals simultaneously sent by a network device by using the K channel resources, and M is a positive integer.

The processing module 820 is further configured to determine a first measurement result of the K channel resources based on the spatial reception parameters of a first interference resource in the M interference resources, where K is a positive integer greater than or equal to 2.

The transceiver module 810 is configured to send a measurement report to the network device, where the measurement report is used to indicate M measurement results, and includes the first measurement result.

In some embodiments, the transceiver module 810 is further configured to receive measurement configuration information, where the measurement configuration information is used to configure N channel resources and the M interference resources, and N is a positive integer.

The processing module 820 is further configured to determine, from the N channel resources, the K channel resources on which the terminal can receive the signals simultaneously sent by the network device.

In some embodiments, time corresponding to the N channel resources is earlier than time corresponding to the M interference resources.

In some embodiments, the processing module 820 is specifically configured to use the spatial reception parameters of the K channel resources as the spatial reception parameters of each interference resource of the M interference resources when at least one of the following cases is met: A group-based beam reporting parameter in the measurement configuration information indicates enabled, where the group-based beam reporting parameter is used to indicate whether to report the M measurement results. The report quantity parameter in the measurement configuration information indicates that the measurement result includes a signal to interference plus noise ratio (SINR). The M interference resources are configured in the measurement configuration information. No transmission configuration index state (TCI-state) of the M interference resources is configured in the measurement configuration information.

In some embodiments, the transceiver module 810 is further configured to receive first configuration information from the network device, where the first configuration information is used to configure the M interference resources and the spatial reception parameters of the K channel resources.

In some embodiments, the transceiver module 810 is specifically configured to use the spatial reception parameters of the K channel resources as the spatial reception parameters of each interference resource of the M interference resources when at least one of the following cases is met: A group-based beam reporting parameter in the first measurement configuration information indicates enabled, and a report quantity parameter in the first measurement configuration information indicates that the measurement result includes an SINR, where the group-based beam reporting parameter is used to indicate whether to report the M measurement results. The group-based beam reporting parameter in the first measurement configuration information indicates enabled, and the M interference resources are configured in the first measurement configuration information, where the group-based beam reporting parameter is used to indicate whether to report the M measurement results. The group-based beam reporting parameter in the first measurement configuration information indicates enabled, the M interference resources are configured in the first measurement configuration information, and no TCI-state of the M interference resources is configured in the first measurement configuration information, where the group-based beam reporting parameter is used to indicate whether to report the M measurement results.

In some embodiments, the transceiver module 810 is further configured to receive second measurement configuration information from the network device, where the second measurement configuration information is used to configure the N channel resources, and N is a positive integer.

The processing module 820 is further configured to determine, based on the second measurement configuration information, the K channel resources on which the terminal can receive the signals simultaneously sent by the network device.

The transceiver module 810 is further configured to send indication information to the network device, where the indication information is used to indicate the K channel resources.

In some embodiments, the processing module 820 is specifically configured to: when at least one of the following cases is met, determine, based on the second measurement configuration information, the K channel resources on which the terminal can receive the signals simultaneously sent by the network device: A group-based beam reporting parameter in the second measurement configuration information indicates enabled, and a report quantity parameter in the second measurement configuration information indicates that the measurement result includes a reference signal received power (RSRP), where the group-based beam reporting parameter is used to indicate whether to report the M measurement results. The group-based beam reporting parameter in the second measurement configuration information indicates enabled, and the M interference resources are not configured in the second measurement configuration information, where the group-based beam reporting parameter is used to indicate whether to report the M measurement results.

In some embodiments, the measurement result includes the SINR, and further includes at least one SINR difference. The at least one SINR difference is a difference between an SINR in each measurement result of the K measurement results except the first measurement result and an SINR in the first measurement result. The first SINR included in the first measurement result is a largest SINR in the K measurement result, there is a mapping relationship between the first SINR and a step, and a product of the step and a bit value is used to indicate the SINR difference.

For more detailed descriptions of the transceiver module 810 and the processing module 820, refer to related descriptions in the foregoing method embodiments. Details are not described herein again.

Figure 9:
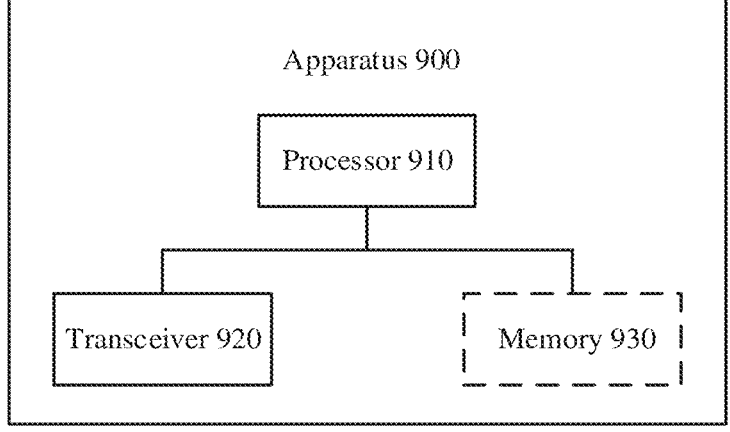
FIG. 9 is a schematic diagram of a structure of a communications apparatus according to an embodiment of this application.

FIG. 9 shows a communications apparatus 900 according to an embodiment of this application. The apparatus 900 may be the terminal in FIG. 4. The apparatus may use a hardware architecture shown in FIG. 9. The apparatus may include a processor 910 and a transceiver 930. In some embodiments, the apparatus may further include a memory 940. The processor 910, the transceiver 930, and the memory 940 communicate with each other through an internal connection path. A related function implemented by the processing module 820 in FIG. 8 may be implemented by the processor 910, and a related function implemented by the transceiver module 810 may be implemented by the processor 910 by controlling the transceiver 930.

In some embodiments, the processor 910 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communications protocol and communications data. The central processing unit may be configured to control the communications apparatus (for example, a base station, a terminal, or a chip), execute a software program, and process data of the software program.

In some embodiments, the processor 910 may include one or more processors, for example, include one or more central processing units (CPU). When the processor is one CPU, the CPU may be a single-core CPU, or may be a multi-core CPU.

The transceiver 930 is configured to send data and/or a signal, and receive data and/or a signal. The transceiver may include a transmitter and a receiver. The transmitter is configured to send data and/or a signal, and the receiver is configured to receive data and/or a signal.

The memory 940 includes but is not limited to a random access memory (RAM), a read-only memory (ROM), an erasable programmable read-only memory (EPROM), and a compact disc read-only memory (CD-ROM). The memory 940 is configured to store related instructions and data.

The memory 940 is configured to store program code and data of the terminal, and may be a separate device or integrated into the processor 910.

Specifically, the processor 910 is configured to control the transceiver to perform information transmission with the terminal. For details, refer to the description in the foregoing method embodiments. Details are not described herein again.

During specific implementation, in an embodiment, the apparatus 900 may further include an output device and an input device. The output device communicates with the processor 910, and may display information in a plurality of manners. For example, the output device may be a liquid crystal display (LCD), a light emitting diode (LED) display device, a cathode ray tube (CRT) display device, a projector, or the like. When communicating with the processor 910, the input device may receive an input from a user in a plurality of manners. For example, the input device may be a mouse, a keyboard, a touchscreen device, or a sensor device.

It may be understood that FIG. 9 merely shows a simplified design of the communications apparatus. During actual application, the apparatus may further include other components, including but not limited to any quantity of transceivers, processors, controllers, memories, and the like, and all terminals that can implement this application shall fall within the protection scope of this application.

In a possible design, the apparatus 900 may be a chip, for example, may be a communications chip that may be used in the terminal, and configured to implement a related function of the processor 910 in the terminal. The chip may be a field programmable gate array, a dedicated integrated chip, a system chip, a central processing unit, a network processor, a digital signal processing circuit, or a microcontroller for implementing the related function, or may be a programmable controller or another integrated chip. In some embodiments, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

Figure 10:
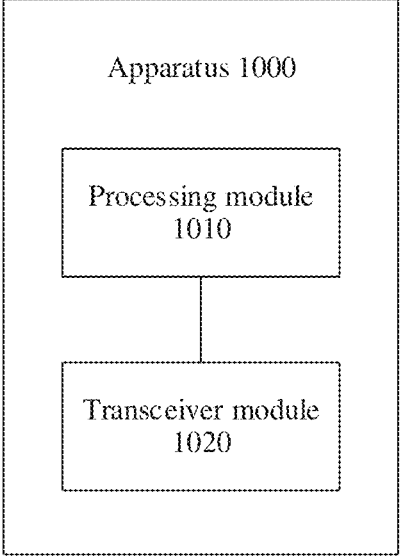
FIG. 10 is a schematic block diagram of a communications apparatus according to another embodiment of this application.

FIG. 10 is a schematic block diagram of a communications apparatus 1000 according to an embodiment of this application.

It should be understood that the apparatus 1000 may correspond to the network device shown in FIG. 1 or the chip in the network device, or the network device or the chip in the network device in the embodiment shown in FIG. 4, and may have any function of the network device in the method. The apparatus 1000 includes a processing module 1010 and a transceiver module 1020.

The processing module 1010 is configured to determine measurement configuration information, where the measurement configuration information is used to configure N channel resources and M interference resources, and N is a positive integer.

The transceiver module 1020 is configured to send the measurement configuration information to a terminal.

In some embodiments, the measurement configuration information includes a group-based beam reporting parameter and/or a report quantity parameter. The group-based beam reporting parameter is used to indicate whether to report M measurement results, and the report quantity parameter indicates that the measurement result includes a signal to interference plus noise ratio (SINR).

In some embodiments, the measurement result includes the SINR, and further includes at least one SINR difference. The at least one SINR difference is a difference between an SINR in each measurement result of the K measurement results except the first measurement result and an SINR in the first measurement result. The first SINR included in the first measurement result is a largest SINR in the K measurement result, there is a mapping relationship between the first SINR and a step, and a product of the step and a bit value is used to indicate the SINR difference.

For more detailed descriptions of the transceiver module 1020 and the processing module 1010, refer to related descriptions in the foregoing method embodiments. Details are not described herein again.

Figure 11:
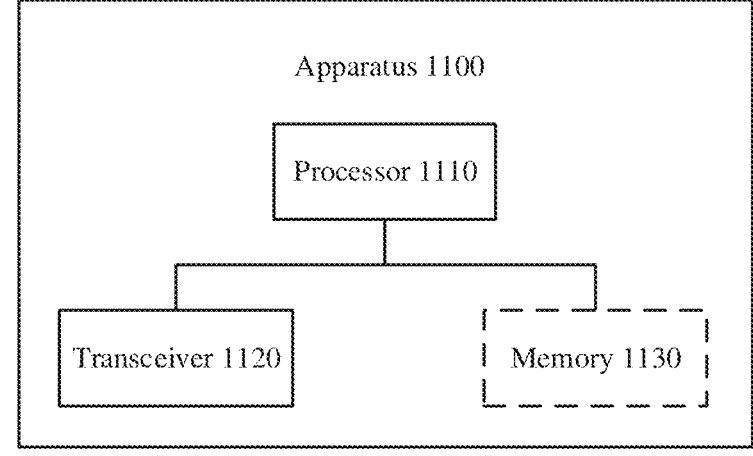
FIG. 11 is a schematic diagram of a structure of a communications apparatus according to an embodiment of this application.

FIG. 11 shows a communications apparatus 1100 according to an embodiment of this application. The apparatus 1100 may be the network device in FIG. 4. The apparatus may use a hardware architecture shown in FIG. 11. The apparatus may include a processor 1110 and a transceiver 1120. In some embodiments, the apparatus may further include a memory 1130. The processor 1110, the transceiver 1120, and the memory 1130 communicate with each other through an internal connection path. A related function implemented by the processing module 1010 in FIG. 10 may be implemented by the processor 1110, and a related function implemented by the transceiver module 1020 may be implemented by the processor 1110 by controlling the transceiver 1120.

In some embodiments, the processor 1110 may be a general-purpose central processing unit (CPU), a microprocessor, an application-specific integrated circuit (ASIC), a dedicated processor, or one or more integrated circuits configured to perform the technical solutions in embodiments of this application. Alternatively, the processor may be one or more devices, circuits, and/or processing cores configured to process data (for example, computer program instructions). For example, the processor may be a baseband processor or a central processing unit. The baseband processor may be configured to process a communications protocol and communications data. The central processing unit may be configured to control the communications apparatus (for example, a base station, a terminal, or a chip), execute a software program, and process data of the software program.

In some embodiments, the processor 1110 may include one or more processors, for example, include one or more central processing units (CPUs). When the processor is one CPU, the CPU may be a single-core CPU or a multi-core CPU.

The transceiver 1120 is configured to send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a random access memory (random access memory, RAM), a read-only memory (ROM), an erasable programmable read-only memory (EPROM), and a compact disc read-only memory (CD-ROM). The memory 1130 is configured to store related instructions and related data.

The memory 1130 is configured to store program code and data of the network device, and may be a separate device or integrated into the processor 1110.

Specifically, the processor 1110 is configured to control the transceiver to perform information transmission with the terminal. For details, refer to the description in the foregoing method embodiments. Details are not described herein again.

During specific implementation, in an embodiment, the apparatus 1100 may further include an output device and an input device. The output device communicates with the processor 1110, and may display information in a plurality of manners. For example, the output device may be a liquid crystal display (LCD), a light emitting diode (LED) display device, a cathode ray tube (CRT) display device, a projector, or the like. The input device communicates with the processor 1110, and may receive an input from a user in a plurality of manners. For example, the input device may be a mouse, a keyboard, a touchscreen device, or a sensor device.

It may be understood that FIG. 11 merely shows a simplified design of the communications apparatus. During actual application, the apparatus may further include other components, including but not limited to any quantity of transceivers, processors, controllers, memories, and the like, and all network devices that can implement this application shall fall within the protection scope of this application.

In a possible design, the apparatus 1100 may be a chip, for example, may be a communications chip that can be used in a network device, and configured to implement a related function of the processor 1110 in the network device. The chip may be a field programmable gate array, a dedicated integrated chip, a system chip, a central processing unit, a network processor, a digital signal processing circuit, or a microcontroller for implementing the related function, or may be a programmable controller or another integrated chip. In some embodiments, the chip may include one or more memories, configured to store program code. When the code is executed, the processor is enabled to implement a corresponding function.

An embodiment of this application further provides an apparatus. The apparatus may be a network device or a circuit. The apparatus may be configured to perform an action performed by the network device in the foregoing method embodiments.

Figure 12:
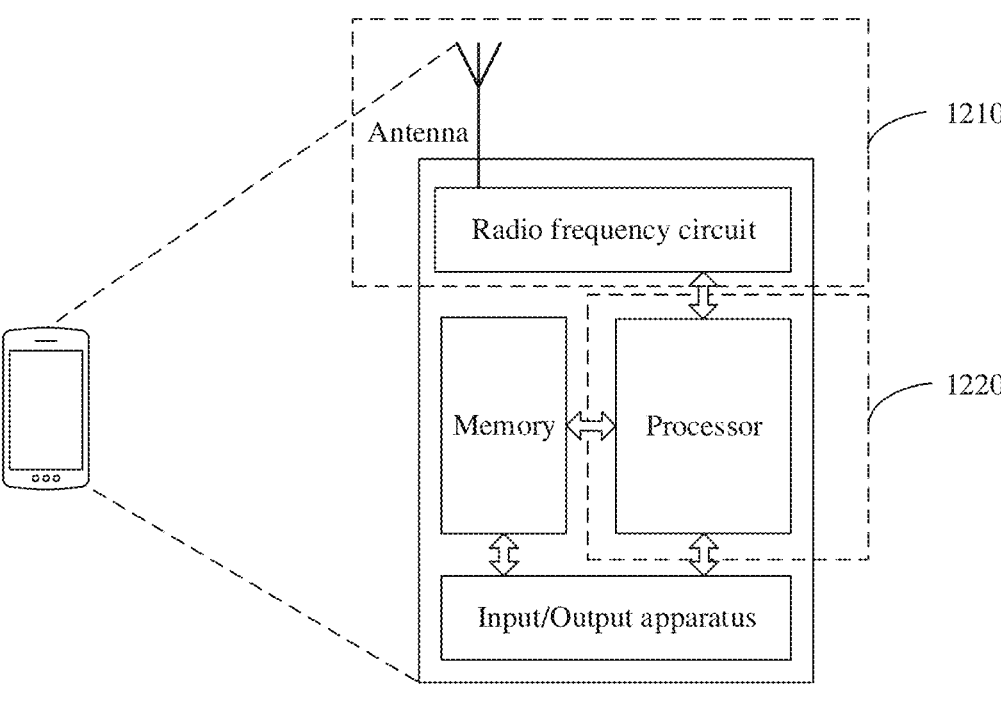
FIG. 12 is a schematic diagram of a structure of a communications apparatus according to an embodiment of this application.

In some embodiments, when the apparatus in this embodiment is a terminal, FIG. 12 is a simplified schematic diagram of a structure of a terminal. For ease of understanding and illustration, in FIG. 12, a mobile phone is used as an example of the terminal. As shown in FIG. 12, the terminal includes a processor, a memory, a radio frequency circuit, an antenna, and an input/output apparatus. The processor is mainly configured to process a communications protocol and communications data, control the terminal, execute a software program, process data of the software program, and so on. The memory is mainly configured to store the software program and data. A radio frequency circuit is mainly configured to perform conversion between a baseband signal and a radio frequency signal, and process a radio frequency signal. The antenna is mainly configured to send and receive a radio frequency signal in an electromagnetic wave form. The input/output apparatus, for example, a touchscreen, a display, or a keyboard, is mainly configured to receive data entered by a user, and output data to the user. It should be noted that some types of terminals may not have the input/output apparatus.

When data is to be sent, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 12, the terminal includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. In some embodiments, a component that is in the transceiver unit 1210 and that is configured to implement a receiving function may be considered as a receiving unit, and a component that is in the transceiver unit 1210 and that is configured to implement a sending function may be considered as a sending unit. In other words, the transceiver unit 1210 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmitter circuit, or the like.

It should be understood that the transceiver unit 1210 is configured to perform a sending operation and a receiving operation on a terminal side in the foregoing method embodiments, and the processing unit 1220 is configured to perform an operation other than the receiving/sending operation of the terminal in the foregoing method embodiments.

For example, in an implementation, the processing unit 1220 is configured to perform processing steps 401 and 402 on the terminal side in FIG. 4. The transceiver unit 1210 is configured to perform the sending operation and the receiving operation in step 403 in FIG. 4, and/or the transceiver unit 1210 is further configured to perform other sending and receiving steps on the terminal side in embodiments of this application.

When the apparatus is a chip, the chip includes a transceiver unit and a processing unit. The transceiver unit may be an input/output circuit or a communications interface. The processing unit is a processor, a microprocessor, or an integrated circuit integrated on the chip.

Figure 13:
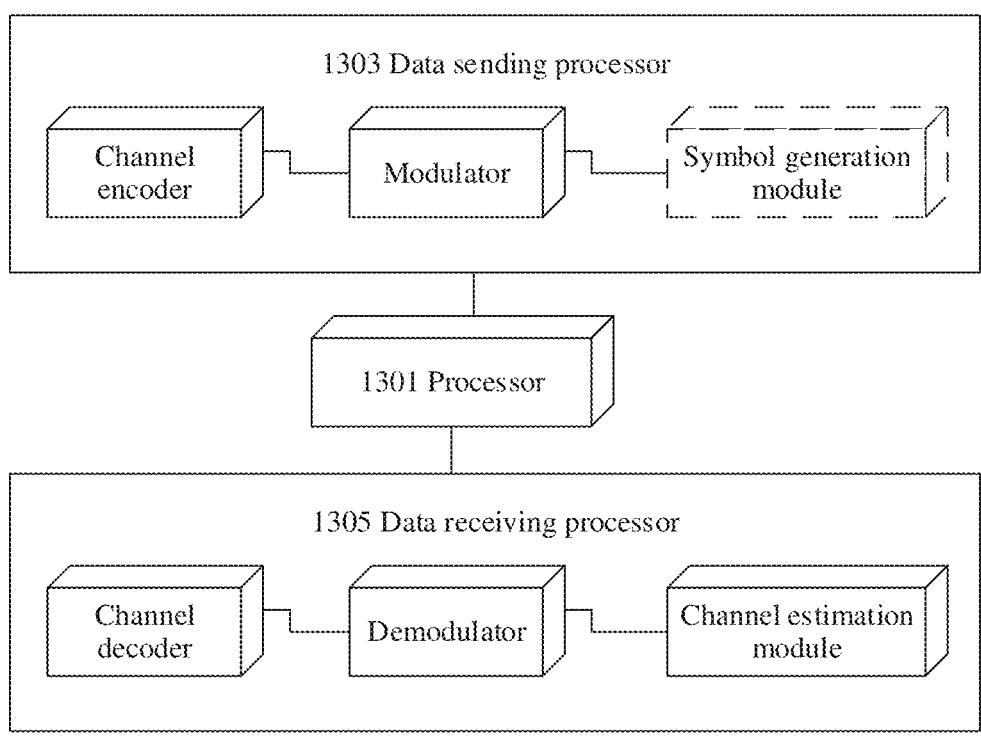
FIG. 13 is a schematic diagram of a structure of a communications apparatus according to another embodiment of this application.

In some embodiments, when the apparatus is a terminal, further refer to the device shown in FIG. 13. In an example, the device may implement a function similar to that of the processor 910 in FIG. 9. In FIG. 13, the device includes a processor 1301, a data sending processor 1303, and a data receiving processor 1305. The processing module 820 in the embodiment shown in FIG. 8 may be the processor 1301 in FIG. 13, and implements a corresponding function. The transceiver module 810 in the embodiment shown in FIG. 8 may be the data sending processor 1303 and a data receiving processor 1305 in FIG. 13. Although FIG. 13 shows a channel encoder and a channel decoder, it may be understood that these modules are merely examples, and do not constitute a limitation on this embodiment.

Figure 14:
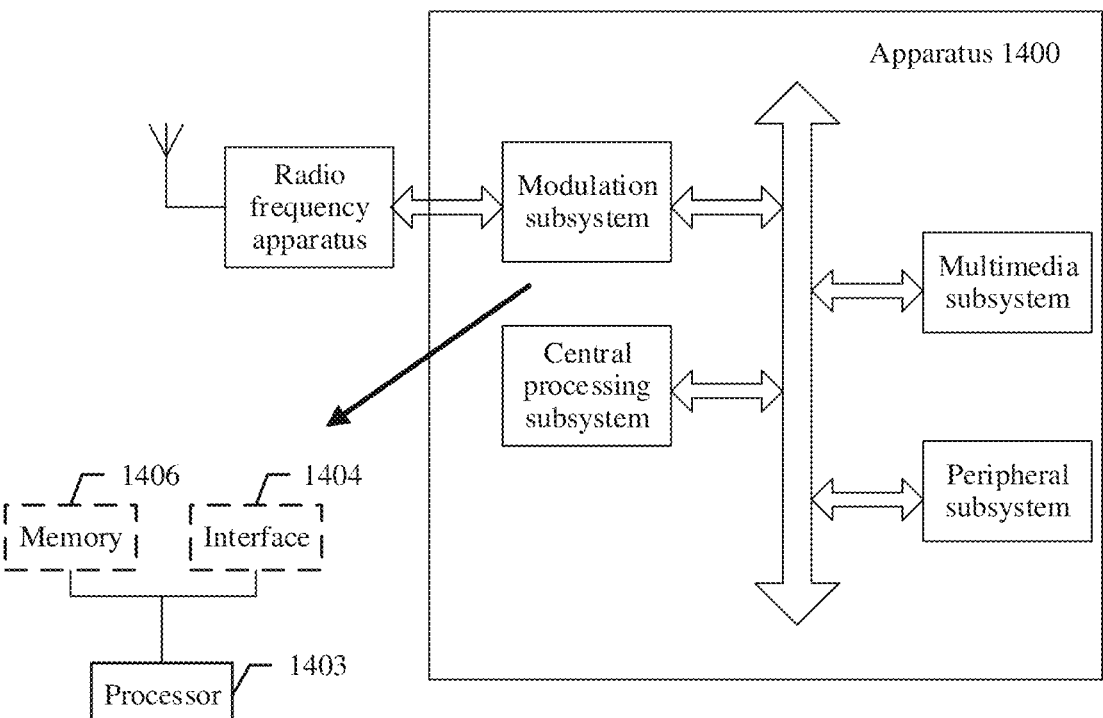
FIG. 14 is a schematic diagram of a structure of a communications apparatus according to another embodiment of this application.

FIG. 14 shows another form of this embodiment. A processing apparatus 1400 includes modules such as a modulation subsystem, a central processing subsystem, and a peripheral subsystem. A communications device in this embodiment may be used as the modulation subsystem in the apparatus. Specifically, the modulation subsystem may include a processor 1403 and an interface 1404. The processor 1403 implements a function of the processing module 820, and the interface 1404 implements a function of the transceiver module 810. As another variation, the modulation subsystem includes a memory 1406, a processor 1403, and a program that is stored in the memory and that can be run on the processor. The processor executes the program to implement the methods in the foregoing embodiments. It should be noted that the memory 1406 may be non-volatile or volatile. The memory 1406 may be located inside the modulation subsystem, or may be located in the processing apparatus 1400, provided that the memory 1406 can be connected to the processor 1403.

Figure 15:
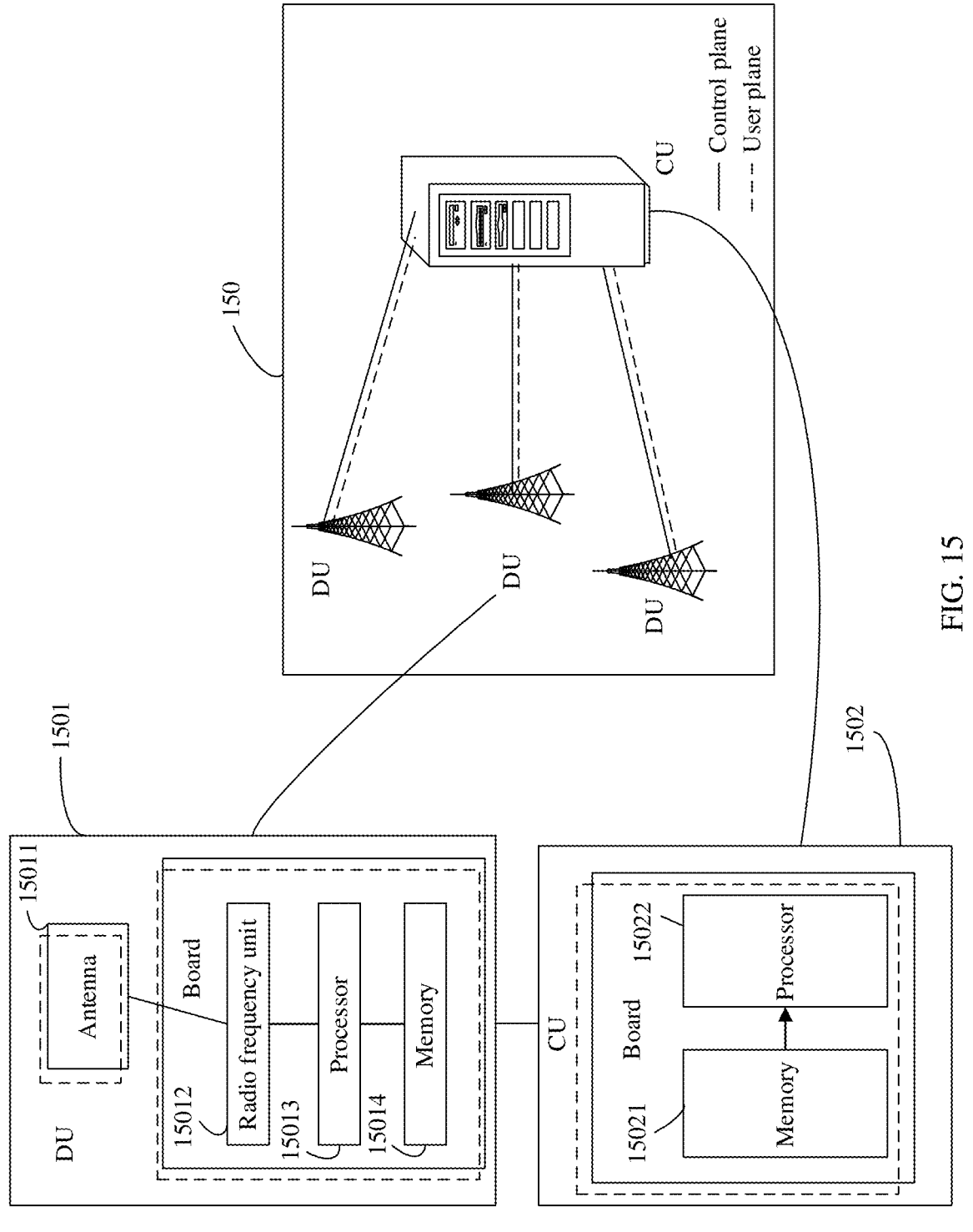
FIG. 15 is a schematic diagram of a structure of a communications apparatus according to another embodiment of this application.

When the apparatus in this embodiment is a network device, the network device may be shown in FIG. 15. For example, the apparatus 150 is a base station. The base station may be used in the system shown in FIG. 1, to perform a function of the network device in the foregoing method embodiments. The base station 150 may include one or more DUs 1501 and one or more CUs 1502. The CU 1502 may communicate with a next-generation core (NG core, NC). The DU 1501 may include at least one antenna 15011, at least one radio frequency unit 15012, at least one processor 15013, and at least one memory 15014. The DU 1501 is mainly configured to receive and send a radio frequency signal, convert a radio frequency signal and a baseband signal, and perform some baseband processing. The CU 1502 may include at least one processor 15022 and at least one memory 15021. The CU 1502 and the DU 1501 may communicate with each other through an interface. A control plane interface may be an Fs-C, for example, F1-C, and a user plane interface may be an Fs-U, for example, F1-U.

The CU 1502 is mainly configured to perform baseband processing, control the base station, and the like. The DU 1501 and the CU 1502 may be physically disposed together, or may be physically separated, that is, in a distributed base station. The CU 1502 is a control center of the base station, may also be referred to as a processing unit, and is mainly configured to complete a baseband processing function. For example, the CU 1502 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (PDCP) layer and a protocol layer above the PDCP layer are set in the CU. Functions of protocol layers below the PDCP layer, such as a radio link control (RLC) layer and a media access control (MAC) layer, are set in the DU. For another example, the CU implements functions of a radio resource control (RRC) layer and a packet data convergence protocol (PDCP) layer. The DU implements functions of a radio link control (RLC) layer, a MAC layer, and a physical (PHY) layer.

In addition, in some embodiments, the base station 150 may include one or more radio frequency units (RU), one or more DUs, and one or more CUs. The DU may include at least one processor 15013 and at least one memory 15014, the RU may include at least one antenna 15011 and at least one radio frequency unit 15012, and the CU may include at least one processor 15022 and at least one memory 15021.

For example, in an implementation, the processor 15013 is configured to perform the processing steps on the network device side in FIG. 4. The radio frequency unit 15012 is configured to perform the sending and receiving operations in step 403 in FIG. 4.

In an example, the CU 1502 may include one or more boards, and a plurality of boards may jointly support a radio access network (for example, a 5G network) of a single access standard, or may separately support radio access networks (such as an LTE network, a 5G network, or another network) of different access standards. The memory 15021 and the processor 15022 may serve one or more boards. In other words, the memory and the processor may be disposed on each board. Alternatively, a plurality of boards may share a same memory and a same processor. In addition, a circuit may be further disposed on each board. The DU 1501 may include one or more boards, and a plurality of boards may jointly support a radio access network (for example, a 5G network) of a single access standard, or may separately support radio access networks (such as an LTE network, a 5G network, or another network) of different access standards. The memory 15014 and the processor 15013 may serve one or more boards. In other words, the memory and the processor may be disposed on each board. Alternatively, a plurality of boards may share a same memory and a same processor. In addition, a circuit may be further disposed on each board.

All or some of the foregoing embodiments may be implemented by software, hardware, firmware, or any combination thereof. When the software is used to implement the foregoing embodiments, all or some of the foregoing embodiments may be implemented in a form of a computer program product. The computer program product includes one or more computer instructions. When the computer instructions are loaded and executed on the computer, the procedure or functions according to embodiments of this application are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

It should be understood that, the processor may be an integrated circuit chip, and has a signal processing capability. In an implementation process, steps in the foregoing method embodiments may be implemented by using a hardware integrated logic circuit in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods, the steps, and logic block diagrams that are disclosed in embodiments of this application may be implemented or performed. The general-purpose processor may be a microprocessor, or the processor may be any processor or the like. The steps of the methods disclosed with reference to embodiments of this application may be directly presented as being performed and completed by a hardware decoding processor, or performed and completed by a combination of hardware and a software module in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing method in combination with hardware of the processor.

It may be understood that, in embodiments of this application, the memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

In this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiment are included in at least one embodiment of the present disclosure. Therefore, "in one embodiment" or "in an embodiment" appearing in the entire specification does not necessarily refer to a same embodiment. In addition, these particular features, structures, or characteristics may be combined in one or more embodiments in any appropriate manner. It should be understood that sequence numbers of the foregoing processes do not mean execution sequences in embodiments of the present disclosure. The execution sequences of the processes should be determined based on functions and internal logic of the processes, and should not constitute any limitation on the implementation processes of embodiments of the present disclosure.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may perform communication by using a local and/or remote process and according to, for example, a signal having one or more data packets (for example, data from two components interacting with another component in a local system, a distributed system, and/or across a network such as the internet interacting with other systems by using the signal).

It should be further understood that "first", "second", and various numerical symbols in this specification are merely used for distinguishing for ease of description, and are not intended to limit the scope of embodiments of this application.

It should be understood that the term "and/or" in this specification describes only an association relationship for describing associated objects and represents that three relationships may exist. For example, A and/or B may represent the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An interference measurement reporting method, comprising:

configuring, by a terminal, spatial reception parameters of K channel resources as spatial reception parameters of each interference resource of M interference resources of the terminal, wherein the K channel resources are channel resources on which the terminal is configured to simultaneously receive signals from a network device, and M is a positive integer;

measuring, by the terminal, a first interference resource based on spatial reception parameters of a first interference resource in the M interference resources, and determining a first measurement result of the K channel resources under interference of the first interference resource, wherein K is a positive integer greater than or equal to 2; and sending, by the terminal, a measurement report to the network device, wherein the measurement report indicates M measurement results, and the measurement report comprises the first measurement result, wherein the M measurement results comprise a corresponding signal to interference plus noise ratio (SINR), the measurement report further comprises at least one SINR difference, the at least one SINR difference is a difference between an SINR in each measurement result of the K measurement results except the first measurement result, and a first SINR in the first measurement result, the first SINR is a largest SINR in the K measurement results; and a mapping relationship exists between the first SINR and a quantization step, and a product of the step and a bit value is useable to indicate the at least one SINR difference.

2. The method according to claim 1, wherein before the configuring, by the terminal, the spatial reception parameters of the K channel resources as the spatial reception parameters of each interference resource of the M interference resources of the terminal, the PATENT method further comprises:

receiving, by the terminal, measurement configuration information, wherein the measurement configuration information is usable to configure N channel resources and the M interference resources, and N is a positive integer; and determining, by the terminal from the N channel resources, the K channel resources on which the terminal is configured to simultaneously receive the signals from the network device.

3. The method according to claim 2, wherein at least one time corresponding to the N channel resources is earlier than at least one time corresponding to the M interference resources.

4. The method according to claim 2, wherein the configuring, by the terminal, the spatial reception parameters of the K channel resources as the spatial reception parameters of each interference resource of the M interference resources of the terminal comprises:

configuring, by the terminal, the spatial reception parameters of the K channel resources as the spatial reception parameters of each interference resource of the M interference resources in response to satisfying at least one of:

a group-based beam reporting parameter in the measurement configuration information is configured as being enabled, wherein the group-based beam reporting parameter is usable to indicate whether to report the M measurement results in response to being enabled;

a report quantity parameter in the measurement configuration information indicates that a measurement result comprises a signal to interference plus noise ratio (SINR);

the M interference resources are configured in the measurement configuration information; or the measurement configuration information fails to include transmission configuration index state (TCI-state) of the M interference resources.

5. The method according to claim 1, wherein before the configuring, by the terminal, the spatial reception parameters of the K channel resources as the spatial reception parameters of each interference resource of the M interference resources of the terminal, the method further comprises:

receiving, by the terminal, first measurement configuration information from the network device, wherein the first measurement configuration information is usable to configure the M interference resources and the spatial reception parameters of the K channel resources.

6. The method according to claim 5, wherein the configuring, by the terminal, the spatial reception parameters of the K channel resources as the spatial reception parameters of each interference resource of the M interference resources of the terminal comprises:

configuring, by the terminal, the spatial reception parameters of the K channel resources as the spatial reception parameters of each interference resource of the M interference resources in response to satisfying at least one of:

a group-based beam reporting parameter in the first measurement configuration information is configured as being enabled, and a report quantity parameter in the first measurement configuration information indicates that a measurement result comprises a signal to interference plus noise ratio (SINR), wherein the group-based beam reporting parameter is usable to indicate whether to report the M measurement results in response to being enabled;

the group-based beam reporting parameter in the first measurement configuration information is configured as being enabled, and the M interference resources are configured in the first measurement configuration information, wherein the group-based beam reporting parameter is usable to indicate whether to report the M measurement results in response to being enabled; and the group-based beam reporting parameter in the first measurement configuration information is configured as being enabled, the M interference resources are configured in the first measurement configuration information, and the first measurement configuration information fails to include transmission configuration index state (TCI-state) of the M interference resources, wherein the group-based beam reporting parameter is usable to indicate whether to report the M measurement results in response to being enabled.

7. The method according to claim 5, wherein before the receiving, by the terminal, the first measurement configuration information from the network device, the method further comprises:

receiving, by the terminal, second measurement configuration information from the network device, wherein the second measurement configuration information is useable to configure N channel resources, and N is a positive integer;

determining, by the terminal based on the second measurement configuration information, the K channel resources on which the terminal is configured to simultaneously receive the signals from the network device; and sending, by the terminal, indication information to the network device, wherein the indication information is useable to indicate the K channel resources.

8. The method according to claim 7, wherein the determining, by the terminal based on the second measurement configuration information, the K channel resources on which the terminal is configured to simultaneously receive the signals from the network device comprises:

determining, by the terminal based on the second measurement configuration information, the K channel resources on which the terminal is configured to simultaneously receive the signals from the network device in response to satisfying at least one of:

a group-based beam reporting parameter in the second measurement configuration information is configured as being enabled, and a report quantity parameter in the second measurement configuration information indicates that the measurement result comprises a reference signal received power (RSRP), wherein the group-based beam reporting parameter is usable to indicate whether to report the M measurement results in response to being enabled; and the group-based beam reporting parameter in the second measurement configuration information is configured as being enabled, and the second measurement configuration information fails to include the M interference resources, wherein the group-based beam reporting parameter is usable to indicate whether to report the M measurement results in response to being enabled.

9. A communications apparatus, comprising:

a processor, configured to arrange spatial reception parameters of K channel resources as spatial reception parameters of each interference resource of M interference resources of the communications apparatus, wherein the K channel resources are channel resources on which the communications apparatus is configured to simultaneously receive signals from a network device, M is a positive integer, the processor is further configured to determine a first measurement result of the K channel resources based on spatial reception parameters of a first interference resource in the M interference resources, and K is a positive integer greater than or equal to 2; and a transceiver, configured to send a measurement report to the network device, wherein the measurement report indicates M measurement results, and the measurement report comprises the first measurement result, wherein the M measurement results comprise a corresponding signal to interference plus noise ratio (SINR), the measurement report further comprises at least one SINR difference, the at least one SINR difference is a difference between an SINR in each measurement result of the K measurement results except the first measurement result, and a first SINR in the first measurement result, the first SINR is a largest SINR in the K measurement results; and a mapping relationship exists between the first SINR and a quantization step, and a product of the step and a bit value is useable to indicate the at least one SINR difference.

10. The apparatus according to claim 9, wherein the transceiver is further configured to receive measurement configuration information, the measurement configuration information is usable to configure N channel resources and the M interference resources, and N is a positive integer; and the processor is further configured to determine, from the N channel resources, the K channel resources on which the communications apparatus is configured to simultaneously receive the signals from the network device.

11. The apparatus according to claim 10, wherein at least one time corresponding to the N channel resources is earlier than at least one time corresponding to the M interference resources.

12. The apparatus according to claim 10, wherein the processor further configured to arrange the spatial reception parameters of the K channel resources as the spatial reception parameters of each interference resource of the M interference resources in response to satisfying at least one of:

a group-based beam reporting parameter in the measurement configuration information is configured as being enabled, wherein the group-based beam reporting parameter is useable to indicate whether to report the M measurement results in response to being enabled;

a report quantity parameter in the measurement configuration information indicates that a measurement result comprises a signal to interference plus noise ratio (SINR);

the M interference resources are configured in the measurement configuration information; or the measurement configuration information fails to include transmission configuration index state (TCI-state) of the M interference resources.

13. The apparatus according to claim 9, wherein before the processor is configured to arrange the spatial reception parameters of the K channel resources as the spatial reception parameters of an interference resource of the communications apparatus, the transceiver is further configured to:

receive first measurement configuration information from the network device, wherein the first measurement configuration information is usable to configure the M interference resources and the spatial reception parameters of the K channel resources.

14. The apparatus according to claim 13, wherein the processor further configured to arrange the spatial reception parameters of the K channel resources as the spatial reception parameters of each interference resource of the M interference resources in response to satisfying at least one of:

a group-based beam reporting parameter in the first measurement configuration information is configured as being enabled, and a report quantity parameter in the first measurement configuration information indicates that a measurement result comprises a signal to interference plus noise ratio (SINR), wherein the group-based beam reporting parameter is usable to indicate whether to report the M measurement results in response to being enabled;

the group-based beam reporting parameter in the first measurement configuration information is configured as being enabled, and the M interference resources are configured in the first measurement configuration information, wherein the group-based beam reporting parameter is usable to indicate whether to report the M measurement results in response to being enabled; and the group-based beam reporting parameter in the first measurement configuration information is configured as being enabled, the M interference resources are configured in the first measurement configuration information, and the first measurement configuration information fails to include transmission configuration index state (TCI-state) of the M interference resources, wherein the group-based beam reporting parameter is useable to indicate whether to report the M measurement results in response to being enabled.

15. The apparatus according to claim 14, wherein the transceiver is further configured to receive second measurement configuration information from the network device, wherein the second measurement configuration information is useable to configure the N channel resources, and N is a positive integer;

the processor is further configured to determine, based on the second measurement configuration information, the K channel resources on which the communications apparatus is configured to simultaneously receive the signals from the network device; and the transceiver is further configured to send indication information to the network device, wherein the indication information is useable to indicate the K channel resources.

16. The apparatus according to claim 15, wherein the processor is further configured to:

determine, based on the second measurement configuration information, the K channel resources on which the communications apparatus is configured to simultaneously receive the signals from the network device in response to satisfying at least one of:

a group-based beam reporting parameter in the second measurement configuration information is configured as being enabled, and a report quantity parameter in the second measurement configuration information indicates that the measurement result comprises a reference signal received power (RSRP), wherein the group-based beam reporting parameter is usable to indicate whether to report the M measurement results in response to being enabled; and the group-based beam reporting parameter in the second measurement configuration information is configured as being enabled, and the second measurement configuration information fails to include the M interference resources, wherein the group-based beam reporting parameter is usable to indicate whether to report the M measurement results in response to being enabled.

17. A computer-readable storage medium, wherein the computer-readable storage medium comprises non-transitory instructions; and in response to the non-transitory instructions being executed by a processor, the processor is configured to perform at least one of:

configuring spatial reception parameters of K channel resources as spatial reception parameters of each interference resource of M interference resources of a terminal, wherein the K channel resources are channel resources on which the terminal is configured to simultaneously receive signals from a network device, and M is a positive integer;

determining a first measurement result of the K channel resources based on spatial reception parameters of a first interference resource in the M interference resources, wherein K is a positive integer greater than or equal to 2; and sending a measurement report to the network device, wherein the measurement report indicates M measurement results, and the measurement report comprises the first measurement result, wherein the M measurement results comprise a corresponding signal to interference plus noise ratio (SINR), the measurement report further comprises at least one SINR difference, the at least one SINR difference is a difference between an SINR in each measurement result of the K measurement results except the first measurement result, and a first SINR in the first measurement result, the first SINR is a largest SINR in the K measurement results; and a mapping relationship exists between the first SINR and a quantization step, and a product of the step and a bit value is useable to indicate the at least one SINR difference.

* * * * *